(12) United States Patent
Kakutani

(10) Patent No.: US 7,669,953 B2
(45) Date of Patent: Mar. 2, 2010

(54) HIGH-IMAGE-QUALITY HALFTONE PROCESS

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 838 days.

(21) Appl. No.: 11/521,137

(22) Filed: Sep. 13, 2006

(65) Prior Publication Data

US 2007/0058202 A1 Mar. 15, 2007

(30) Foreign Application Priority Data

Sep. 15, 2005 (JP) ............................. 2005-268976
Jan. 16, 2006 (JP) ............................. 2006-007000

(51) Int. Cl.
*B41J 2/205* (2006.01)
*B41J 2/15* (2006.01)
*G06F 15/00* (2006.01)
*H04N 1/405* (2006.01)

(52) U.S. Cl. ............................. 347/15; 347/41; 358/1.9; 358/3.06

(58) Field of Classification Search ...................... 347/9, 347/14, 15, 41, 43; 358/3.01–3.23, 3.26, 358/1.9
See application file for complete search history.

(56) References Cited

U.S. PATENT DOCUMENTS

| | | | | |
|---|---|---|---|---|
| 5,526,438 A | * | 6/1996 | Barton | 382/237 |
| 7,099,049 B2 | * | 8/2006 | Yu et al. | 358/3.26 |
| 7,387,355 B2 | * | 6/2008 | Kakutani | 347/15 |
| 2007/0058204 A1 | * | 3/2007 | Kakutani | 358/3.13 |

FOREIGN PATENT DOCUMENTS

| | | |
|---|---|---|
| JP | 07-081190 | 3/1995 |
| JP | 07-177351 | 7/1995 |
| JP | 10262151 A * | 9/1998 |
| JP | 10-329381 | 12/1998 |

OTHER PUBLICATIONS

Abstract of Japanese Patent Publication No. 07-081190, Pub. Date: Mar. 28, 1995, Patent Abstracts of Japan.

(Continued)

*Primary Examiner*—Stephen D Meier
*Assistant Examiner*—Rene Garcia, Jr.
(74) *Attorney, Agent, or Firm*—Martine Penilla & Gencarella, LLP

(57) ABSTRACT

This invention provides a printing method of printing on a print medium. The method includes: a dot data generating step of performing a halftone process on image data representing a input tone value of each of pixels constituting an original image, for generating dot data representing a status of dot formation on each of print pixels of a print image to be formed on the print medium; and a print image generating step of forming a dot on each of the print pixels for generating a print image according to the dot data. The print image generating step includes the step of generating the print image by mutually combining dots formed on print pixels belonging to each of a plurality of pixel groups in a common print area. The plurality of pixel groups have a physical difference each other at the dot formation, the dot formation being performed with respect to each of the pixel groups. The halftone process is configured to give specified characteristics to all of dot patterns formed on print pixels belonging to each of the plurality of pixel groups, and to equalize numbers of dots formed on print pixels belonging to each of the plurality of pixel groups, for each of the input tone values.

18 Claims, 20 Drawing Sheets

OTHER PUBLICATIONS

Abstract of Japanese Patent Publication No. 07-177351, Pub. Date: Jul. 14, 1995, Patent Abstracts of Japan.

Abstract of Japanese Patent Publication No. 10-329381, Pub. Date: Dec. 15, 1998, Patent Abstracts of Japan.

* cited by examiner

Fig.4

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 1 | 0 | 1 | 0 | 1 | 0 | 1 |
| COLUMN 2 | 2 | 3 | 2 | 3 | 2 | 3 | 2 | 3 |
| COLUMN 3 | 0 | 1 | 0 | 1 | 0 | 1 | 0 | 1 |
| COLUMN 4 | 2 | 3 | 2 | 3 | 2 | 3 | 2 | 3 |
| COLUMN 5 | 0 | 1 | 0 | 1 | 0 | 1 | 0 | 1 |
| COLUMN 6 | 2 | 3 | 2 | 3 | 2 | 3 | 2 | 3 |
| COLUMN 7 | 0 | 1 | 0 | 1 | 0 | 1 | 0 | 1 |
| COLUMN 8 | 2 | 3 | 2 | 3 | 2 | 3 | 2 | 3 |

|  | 1 | 2 | 3 | 4 | 5 | 6 | 7 | 8 |
|---|---|---|---|---|---|---|---|---|
| 1 | 0 |  | 0 |  | 0 |  | 0 |  |
| 2 |  |  |  |  |  |  |  |  |
| 3 | 0 |  | 0 |  | 0 |  | 0 |  |
| 4 |  |  |  |  |  |  |  |  |
| 5 | 0 |  | 0 |  | 0 |  | 0 |  |
| 6 |  |  |  |  |  |  |  |  |
| 7 | 0 |  | 0 |  | 0 |  | 0 |  |
| 8 |  |  |  |  |  |  |  |  |

M1:

|  | 1 | 2 | 3 | 4 | 5 | 6 | 7 | 8 |
|---|---|---|---|---|---|---|---|---|
| 1 |  | 1 |  | 1 |  | 1 |  | 1 |
| 2 |  |  |  |  |  |  |  |  |
| 3 |  | 1 |  | 1 |  | 1 |  | 1 |
| 4 |  |  |  |  |  |  |  |  |
| 5 |  | 1 |  | 1 |  | 1 |  | 1 |
| 6 |  |  |  |  |  |  |  |  |
| 7 |  | 1 |  | 1 |  | 1 |  | 1 |
| 8 |  |  |  |  |  |  |  |  |

M2:

|  | 1 | 2 | 3 | 4 | 5 | 6 | 7 | 8 |
|---|---|---|---|---|---|---|---|---|
| 1 |  |  |  |  |  |  |  |  |
| 2 | 2 |  | 2 |  | 2 |  | 2 |  |
| 3 |  |  |  |  |  |  |  |  |
| 4 | 2 |  | 2 |  | 2 |  | 2 |  |
| 5 |  |  |  |  |  |  |  |  |
| 6 | 2 |  | 2 |  | 2 |  | 2 |  |
| 7 |  |  |  |  |  |  |  |  |
| 8 | 2 |  | 2 |  | 2 |  | 2 |  |

M3:

|  | 1 | 2 | 3 | 4 | 5 | 6 | 7 | 8 |
|---|---|---|---|---|---|---|---|---|
| 1 |  |  |  |  |  |  |  |  |
| 2 |  | 3 |  | 3 |  | 3 |  | 3 |
| 3 |  |  |  |  |  |  |  |  |
| 4 |  | 3 |  | 3 |  | 3 |  | 3 |
| 5 |  |  |  |  |  |  |  |  |
| 6 |  | 3 |  | 3 |  | 3 |  | 3 |
| 7 |  |  |  |  |  |  |  |  |
| 8 |  | 3 |  | 3 |  | 3 |  | 3 |

Fig.7

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  | ● |  |  |  |  |  |  |
| COLUMN 3 |  |  |  |  |  | ● |  |  |
| COLUMN 4 | ● |  |  |  |  |  |  |  |
| COLUMN 5 |  |  | ● |  |  |  |  |  |
| COLUMN 6 |  |  |  |  | ● |  |  | ● |
| COLUMN 7 |  |  |  | ● |  |  |  |  |
| COLUMN 8 | ● |  |  |  |  |  | ● |  |

DPM

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  |  |  |  |  |  |  |  |
| COLUMN 3 |  |  |  |  |  |  |  |  |
| COLUMN 4 |  |  |  |  |  |  |  |  |
| COLUMN 5 |  |  | ● |  |  |  |  |  |
| COLUMN 6 |  |  |  |  |  |  |  |  |
| COLUMN 7 |  |  |  |  |  |  |  |  |
| COLUMN 8 |  |  |  |  |  |  |  |  |

DP1

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  |  |  |  |  |
| COLUMN 2 |  |  |  |  |  |  |  |  |
| COLUMN 3 |  |  |  |  |  | ● |  |  |
| COLUMN 4 |  |  |  |  |  |  |  |  |
| COLUMN 5 |  |  |  |  |  |  |  |  |
| COLUMN 6 |  |  |  |  |  |  |  |  |
| COLUMN 7 |  |  |  | ● |  |  |  |  |
| COLUMN 8 |  |  |  |  |  |  |  |  |

DP2

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  |  |  |  |  |
| COLUMN 2 |  |  |  |  |  |  |  |  |
| COLUMN 3 |  |  |  |  |  |  |  |  |
| COLUMN 4 | ● |  |  |  |  |  |  |  |
| COLUMN 5 |  |  |  |  |  |  |  |  |
| COLUMN 6 |  |  |  |  | ● |  |  |  |
| COLUMN 7 |  |  |  |  |  |  |  |  |
| COLUMN 8 | ● |  |  |  |  |  | ● |  |

DP3

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  |  |  |  |  |
| COLUMN 2 |  | ● |  |  |  |  |  |  |
| COLUMN 3 |  |  |  |  |  |  |  |  |
| COLUMN 4 |  |  |  |  |  |  |  |  |
| COLUMN 5 |  |  |  |  |  |  |  |  |
| COLUMN 6 |  |  |  |  |  |  |  | ● |
| COLUMN 7 |  |  |  |  |  |  |  |  |
| COLUMN 8 |  |  |  |  |  |  |  |  |

Fig.9

DDM

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 1 | 0 | 0 | 0 | 0 | 0 | 0 |
| COLUMN 3 | 0 | 0 | 0 | 0 | 0 | 1 | 0 | 0 |
| COLUMN 4 | 1 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 1 | 0 | 0 | 1 |
| COLUMN 7 | 0 | 0 | 0 | 1 | 0 | 0 | 0 | 0 |
| COLUMN 8 | 1 | 0 | 0 | 0 | 0 | 0 | 1 | 0 |

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 0 | 0 | 0 | 0 | 0 | 0 | 0 |
| COLUMN 3 | 0 | 0 | 0 | 0 | 0 | 0 | 0 | 0 |
| COLUMN 4 | 0 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 0 |
| COLUMN 7 | 0 | 0 | 0 | 0 | 0 | 0 | 0 | 0 |
| COLUMN 8 | 0 | 0 | 0 | 0 | 0 | 0 | 0 | 0 |

DD1

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 0 | 0 | 0 | 0 |
| COLUMN 2 | 0 | 0 | 0 | 0 | 0 | 0 | 0 | 0 |
| COLUMN 3 | 0 | 0 | 0 | 0 | 0 | 1 | 0 | 0 |
| COLUMN 4 | 0 | 0 | 0 | 0 | 0 | 0 | 0 | 0 |
| COLUMN 5 | 0 | 0 | 0 | 0 | 0 | 0 | 0 | 0 |
| COLUMN 6 | 0 | 0 | 0 | 0 | 0 | 0 | 0 | 0 |
| COLUMN 7 | 0 | 0 | 0 | 1 | 0 | 0 | 0 | 0 |
| COLUMN 8 | 0 | 0 | 0 | 0 | 0 | 0 | 0 | 0 |

DD3

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 0 | 0 | 0 | 0 |
| COLUMN 2 | 0 | 1 | 0 | 0 | 0 | 0 | 0 | 0 |
| COLUMN 3 | 0 | 0 | 0 | 0 | 0 | 0 | 0 | 0 |
| COLUMN 4 | 0 | 0 | 0 | 0 | 0 | 0 | 0 | 0 |
| COLUMN 5 | 0 | 0 | 0 | 0 | 0 | 0 | 0 | 0 |
| COLUMN 6 | 0 | 0 | 0 | 0 | 0 | 0 | 0 | 1 |
| COLUMN 7 | 0 | 0 | 0 | 0 | 0 | 0 | 0 | 0 |
| COLUMN 8 | 0 | 0 | 0 | 0 | 0 | 0 | 0 | 0 |

Fig.11

|  | ROW 1 | ROW 2 | ROW 3 | ROW 4 | ROW 5 |
|---|---|---|---|---|---|
| COLUMN 1 | 0 | 1 | 2 | 1 | 0 |
| COLUMN 2 | 1 | 3 | 4 | 3 | 1 |
| COLUMN 3 | 2 | 4 | 5 | 4 | 2 |
| COLUMN 4 | 1 | 3 | 4 | 3 | 1 |
| COLUMN 5 | 0 | 1 | 2 | 1 | 0 |

Fig.12

|  | 1 | 2 | 3 | 4 | 5 | 6 | 7 | 8 |  |  |  |  |  |  |  |  |  |  |  |  |  |  |
|---|---|---|---|---|---|---|---|---|---|---|---|---|---|---|---|---|---|---|---|---|---|---|
|  | 0 | 0 | 0 | 1 | 0 | 0 | 0 | 0 | 0 | 0 | 0 | 1 | 0 | 0 | 0 | 0 | 0 | 0 | 1 | 0 | 0 | 0 |
|  | 0 | 1 | 0 | 0 | 0 | 0 | 0 | 0 | 0 | 1 | 0 | 0 | 0 | 0 | 0 | 0 | 1 | 0 | 0 | 0 | 0 | 0 |
|  | 0 | 0 | 0 | 0 | 0 | 1 | 0 | 0 | 0 | 0 | 0 | 0 | 1 | 0 | 0 | 0 | 0 | 0 | 0 | 0 | 1 | 0 |
|  | 1 | 0 | 0 | 0 | 0 | 0 | 0 | 0 | 1 | 0 | 0 | 0 | 0 | 0 | 0 | 0 | 1 | 0 | 0 | 0 | 0 | 0 |
|  | 0 | 0 | 1 | 0 | 0 | 0 | 0 | 0 | 0 | 0 | 1 | 0 | 0 | 0 | 0 | 0 | 0 | 1 | 0 | 0 | 0 | 0 |
|  | 0 | 0 | 0 | 0 | 1 | 0 | 0 | 1 | 0 | 0 | 0 | 1 | 0 | 0 | 1 | 0 | 0 | 0 | 1 | 0 | 0 | 1 |
|  | 0 | 0 | 0 | 1 | 0 | 0 | 0 | 0 | 0 | 0 | 1 | 0 | 0 | 0 | 0 | 0 | 1 | 0 | 0 | 0 | 0 | 0 |
|  | 1 | 0 | 0 | 0 | 0 | 0 | 1 | 0 | 1 | 0 | 0 | 0 | 0 | 1 | 0 | 1 | 0 | 0 | 0 | 0 | 1 | 0 |
| 1 | 0 | 0 | 0 | 1 | 0 | 0 | 0 | 0 | 0 | 0 | 0 | 1 | 0 | 0 | 0 | 0 | 0 | 0 | 1 | 0 | 0 | 0 |
| 2 | 0 | 1 | 0 | 0 | 0 | 0 | 0 | 0 | 0 | 1 | 0 | 0 | 0 | 0 | 0 | 0 | 1 | 0 | 0 | 0 | 0 | 0 |
| 3 | 0 | 0 | 0 | 0 | 0 | 1 | 0 | 0 | 0 | 0 | 0 | 0 | 1 | 0 | 0 | 0 | 0 | 0 | 0 | 0 | 1 | 0 |
| 4 | 1 | 0 | 0 | 0 | 0 | 0 | 0 | 0 | 1 | 0 | 0 | 0 | 0 | 0 | 0 | 0 | 1 | 0 | 0 | 0 | 0 | 0 |
| 5 | 0 | 0 | 1 | 0 | 0 | 0 | 0 | 0 | 0 | 0 | 1 | 0 | 0 | 0 | 0 | 0 | 0 | 1 | 0 | 0 | 0 | 0 |
| 6 | 0 | 0 | 0 | 0 | 1 | 0 | 0 | 1 | 0 | 0 | 0 | 1 | 0 | 0 | 1 | 0 | 0 | 0 | 1 | 0 | 0 | 1 |
| 7 | 0 | 0 | 0 | 1 | 0 | 0 | 0 | 0 | 0 | 0 | 1 | 0 | 0 | 0 | 0 | 0 | 1 | 0 | 0 | 0 | 0 | 0 |
| 8 | 1 | 0 | 0 | 0 | 0 | 0 | 1 | 0 | 1 | 0 | 0 | 0 | 0 | 1 | 0 | 1 | 0 | 0 | 0 | 0 | 1 | 0 |
|  | 0 | 0 | 0 | 1 | 0 | 0 | 0 | 0 | 0 | 0 | 0 | 1 | 0 | 0 | 0 | 0 | 0 | 0 | 1 | 0 | 0 | 0 |
|  | 0 | 1 | 0 | 0 | 0 | 0 | 0 | 0 | 0 | 1 | 0 | 0 | 0 | 0 | 0 | 0 | 1 | 0 | 0 | 0 | 0 | 0 |
|  | 0 | 0 | 0 | 0 | 0 | 1 | 0 | 0 | 0 | 0 | 0 | 0 | 1 | 0 | 0 | 0 | 0 | 0 | 0 | 0 | 1 | 0 |
|  | 1 | 0 | 0 | 0 | 0 | 0 | 0 | 0 | 1 | 0 | 0 | 0 | 0 | 0 | 0 | 0 | 1 | 0 | 0 | 0 | 0 | 0 |
|  | 0 | 0 | 1 | 0 | 0 | 0 | 0 | 0 | 0 | 0 | 1 | 0 | 0 | 0 | 0 | 0 | 0 | 1 | 0 | 0 | 0 | 0 |
|  | 0 | 0 | 0 | 0 | 1 | 0 | 0 | 1 | 0 | 0 | 0 | 1 | 0 | 0 | 1 | 0 | 0 | 0 | 1 | 0 | 0 | 1 |
|  | 0 | 0 | 0 | 1 | 0 | 0 | 0 | 0 | 0 | 0 | 1 | 0 | 0 | 0 | 0 | 0 | 1 | 0 | 0 | 0 | 0 | 0 |
|  | 1 | 0 | 0 | 0 | 0 | 0 | 1 | 0 | 1 | 0 | 0 | 0 | 0 | 1 | 0 | 1 | 0 | 0 | 0 | 0 | 1 | 0 |

Fig.13

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 8 | 7 | 7 | 7 | 8 | 9 | 8 | 7 |
| COLUMN 2 | 8 | 7 | 5 | 6 | 7 | 8 | 6 | 6 |
| COLUMN 3 | 7 | 8 | 6 | 5 | 6 | 6 | 5 | 6 |
| COLUMN 4 | 8 | 9 | 7 | 5 | 6 | 5 | 6 | 7 |
| COLUMN 5 | 9 | 8 | 8 | 9 | 8 | 6 | 6 | 7 |
| COLUMN 6 | 9 | 8 | 9 | 11 | 9 | 8 | 8 | 8 |
| COLUMN 7 | 8 | 7 | 8 | 10 | 11 | 10 | 9 | 10 |
| COLUMN 8 | 9 | 7 | 7 | 8 | 11 | 9 | 9 | 10 |

DFM

|  | 1 | 2 | 3 | 4 | 5 | 6 | 7 | 8 |
|---|---|---|---|---|---|---|---|---|
| 1 | 0 |  | 2 |  | 5 |  | 2 |  |
| 2 |  |  |  |  |  |  |  |  |
| 3 | 0 |  | 2 |  | 2 |  | 0 |  |
| 4 |  |  |  |  |  |  |  |  |
| 5 | 2 |  | 5 |  | 2 |  | 0 |  |
| 6 |  |  |  |  |  |  |  |  |
| 7 | 0 |  | 2 |  | 2 |  | 0 |  |
| 8 |  |  |  |  |  |  |  |  |

DF1:

|  | 1 | 2 | 3 | 4 | 5 | 6 | 7 | 8 |
|---|---|---|---|---|---|---|---|---|
| 1 |  | 0 |  | 2 |  | 2 |  | 0 |
| 2 |  |  |  |  |  |  |  |  |
| 3 |  | 0 |  | 2 |  | 5 |  | 2 |
| 4 |  |  |  |  |  |  |  |  |
| 5 |  | 0 |  | 2 |  | 2 |  | 0 |
| 6 |  |  |  |  |  |  |  |  |
| 7 |  | 2 |  | 5 |  | 2 |  | 0 |
| 8 |  |  |  |  |  |  |  |  |

DF3:

|  | 1 | 2 | 3 | 4 | 5 | 6 | 7 | 8 |
|---|---|---|---|---|---|---|---|---|
| 1 |  |  |  |  |  |  |  |  |
| 2 |  | 5 |  | 2 |  | 0 |  | 2 |
| 3 |  |  |  |  |  |  |  |  |
| 4 |  | 2 |  | 0 |  | 0 |  | 2 |
| 5 |  |  |  |  |  |  |  |  |
| 6 |  | 2 |  | 0 |  | 2 |  | 5 |
| 7 |  |  |  |  |  |  |  |  |
| 8 |  | 2 |  | 0 |  | 0 |  | 2 |

| | ROW 1 | ROW 2 | ROW 3 | ROW 4 | ROW 5 | ROW 6 | ROW 7 | ROW 8 |
|---|---|---|---|---|---|---|---|---|
| COLUMN 1 | 32 | | 30 | | DONE | | 34 | |
| COLUMN 2 | | | | | | | | |
| COLUMN 3 | 28 | | 26 | | 26 | | 20 | |
| COLUMN 4 | | | | | | | | |
| COLUMN 5 | 38 | | DONE | | 34 | | 24 | |
| COLUMN 6 | | | | | | | | |
| COLUMN 7 | 32 | | 34 | | 46 | | 36 | |
| COLUMN 8 | | | | | | | | |

E1

| | ROW 1 | ROW 2 | ROW 3 | ROW 4 | ROW 5 | ROW 6 | ROW 7 | ROW 8 |
|---|---|---|---|---|---|---|---|---|
| COLUMN 1 | | 28 | | 30 | | 38 | | 28 |
| COLUMN 2 | | | | | | | | |
| COLUMN 3 | | 32 | | 22 | | DONE | | 26 |
| COLUMN 4 | | | | | | | | |
| COLUMN 5 | | 32 | | 38 | | 26 | | 28 |
| COLUMN 6 | | | | | | | | |
| COLUMN 7 | | 30 | | DONE | | 42 | | 40 |
| COLUMN 8 | | | | | | | | |

E2

| | ROW 1 | ROW 2 | ROW 3 | ROW 4 | ROW 5 | ROW 6 | ROW 7 | ROW 8 |
|---|---|---|---|---|---|---|---|---|
| COLUMN 1 | | | | | | | | |
| COLUMN 2 | DONE | | DONE | | DONE | | DONE | |
| COLUMN 3 | | | | | | | | |
| COLUMN 4 | DONE | | DONE | | DONE | | DONE | |
| COLUMN 5 | | | | | | | | |
| COLUMN 6 | DONE | | DONE | | DONE | | DONE | |
| COLUMN 7 | | | | | | | | |
| COLUMN 8 | DONE | | DONE | | DONE | | DONE | |

E3

| | ROW 1 | ROW 2 | ROW 3 | ROW 4 | ROW 5 | ROW 6 | ROW 7 | ROW 8 |
|---|---|---|---|---|---|---|---|---|
| COLUMN 1 | | | | | | | | |
| COLUMN 2 | | DONE | | 26 | | 32 | | 26 |
| COLUMN 3 | | | | | | | | |
| COLUMN 4 | | 38 | | 20 | | 20 | | 30 |
| COLUMN 5 | | | | | | | | |
| COLUMN 6 | | 34 | | 44 | | 34 | | DONE |
| COLUMN 7 | | | | | | | | |
| COLUMN 8 | | 30 | | 32 | | 36 | | 42 |

| | ROW 1 | ROW 2 | ROW 3 | ROW 4 | ROW 5 | ROW 6 | ROW 7 | ROW 8 |
|---|---|---|---|---|---|---|---|---|
| COLUMN 1 | 32 | 28 | 30 | 30 | DONE | 38 | 34 | 28 |
| COLUMN 2 | DONE | DONE | DONE | 26 | DONE | 32 | DONE | 26 |
| COLUMN 3 | 28 | 32 | 26 | 22 | 26 | DONE | 20 | 26 |
| COLUMN 4 | DONE | 38 | DONE | 20 | DONE | 20 | DONE | 30 |
| COLUMN 5 | 38 | 32 | DONE | 38 | 34 | 26 | 24 | 28 |
| COLUMN 6 | DONE | 34 | DONE | 44 | DONE | 34 | DONE | DONE |
| COLUMN 7 | 32 | 30 | 34 | DONE | 46 | 42 | 36 | 40 |
| COLUMN 8 | DONE | 30 | DONE | 32 | DONE | 36 | DONE | 42 |

Fig.18

$$\text{RMS GRANULARITY} = \sqrt{\frac{\Sigma(\text{EVALUATION VALUE} - \text{EVALUATION VALUE AVERAGE})^2}{\text{PIXEL COUNT}}}$$

Fig.19

VARIATION EXAMPLE

ERROR DIFFUSION OVERALL MATRIX

MAIN SCAN DIRECTION
SUB SCAN DIRECTION

|   |   | * | 7/48 | 5/48 |
|---|---|---|------|------|
| 3/48 | 5/48 | 7/48 | 5/48 | 3/48 |
| 1/48 | 3/48 | 5/48 | 3/48 | 1/48 |

—Ma

＊:FOCUS PIXEL

Fig.22
ERROR DIFFUSION SAME MAIN SCAN GROUP MATRIX
(AFTER WEIGHTING ADJUSTMENT)
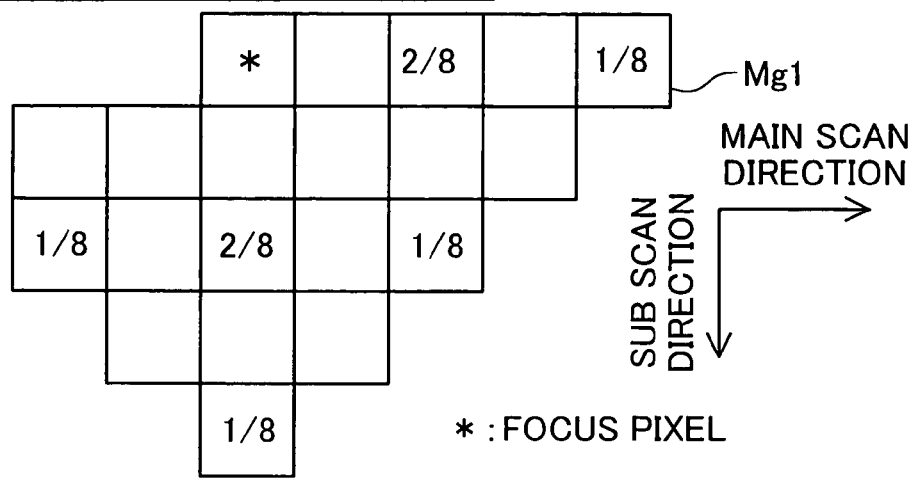
4 PIXEL GROUPS FOR WHICH DOTS ARE FORMED
BY THE SAME MAIN SCAN
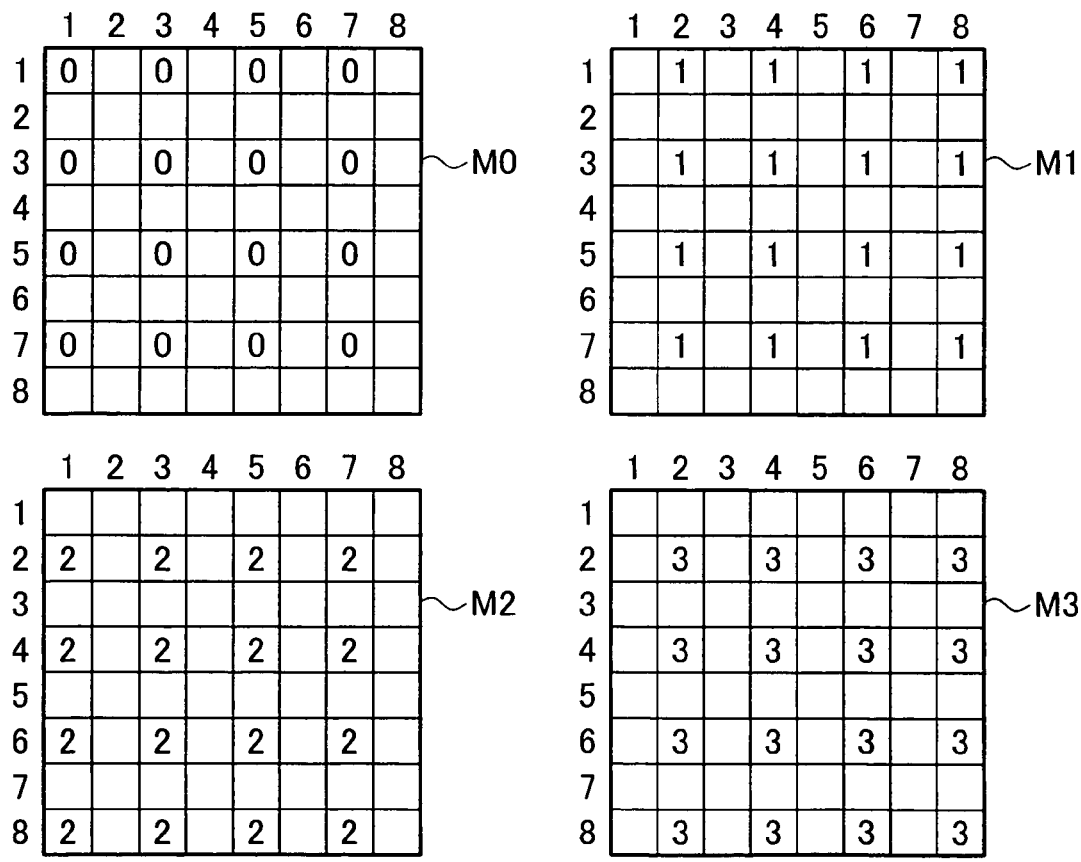

TWO GROUPS OF PIXEL GROUPS FOR WHICH DOTS ARE FORMED IN THE SAME MAIN SCAN DIRECTION

|   | 1 | 2 | 3 | 4 | 5 | 6 | 7 | 8 |
|---|---|---|---|---|---|---|---|---|
| 1 | 0 | 1 | 0 | 1 | 0 | 1 | 0 | 1 |
| 2 |   |   |   |   |   |   |   |   |
| 3 | 0 | 1 | 0 | 1 | 0 | 1 | 0 | 1 |
| 4 |   |   |   |   |   |   |   |   |
| 5 | 0 | 1 | 0 | 1 | 0 | 1 | 0 | 1 |
| 6 |   |   |   |   |   |   |   |   |
| 7 | 0 | 1 | 0 | 1 | 0 | 1 | 0 | 1 |
| 8 |   |   |   |   |   |   |   |   |

~M01

|   | 1 | 2 | 3 | 4 | 5 | 6 | 7 | 8 |
|---|---|---|---|---|---|---|---|---|
| 1 |   |   |   |   |   |   |   |   |
| 2 | 2 | 3 | 2 | 3 | 2 | 3 | 2 | 3 |
| 3 |   |   |   |   |   |   |   |   |
| 4 | 2 | 3 | 2 | 3 | 2 | 3 | 2 | 3 |
| 5 |   |   |   |   |   |   |   |   |
| 6 | 2 | 3 | 2 | 3 | 2 | 3 | 2 | 3 |
| 7 |   |   |   |   |   |   |   |   |
| 8 | 2 | 3 | 2 | 3 | 2 | 3 | 2 | 3 |

~M23

ERROR DIFFUSION SAME MAIN SCAN DIRECTION GROUP MATRIX

|   |   | * | 8/24 | 4/24 | 2/24 |
|---|---|---|------|------|------|
| 1/24 | 2/24 | 4/24 | 2/24 | 1/24 |   |

Mg2

MAIN SCAN DIRECTION →
SUB SCAN DIRECTION ↓

* : FOCUS PIXEL

Fig.26
ERROR DIFFUSION SYNTHETIC PROCESS
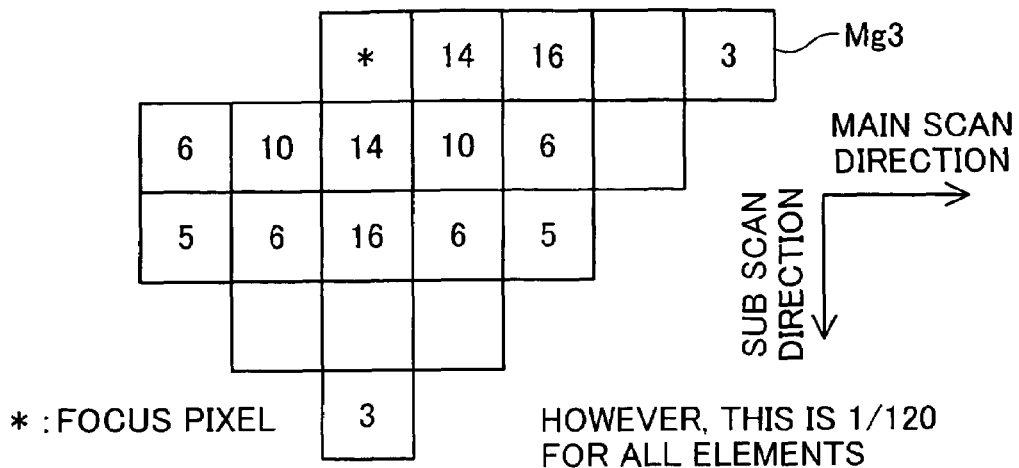
* : FOCUS PIXEL
HOWEVER, THIS IS 1/120 FOR ALL ELEMENTS
ERROR DIFFUSION OVERALL MATRIX
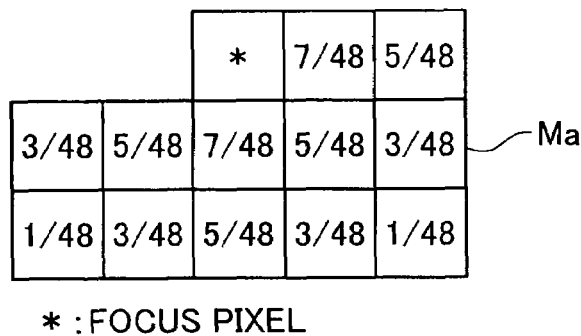
* : FOCUS PIXEL
ERROR DIFFUSION SAME MAIN SCAN GROUP MATRIX (AFTER WEIGHTING ADJUSTMENT)
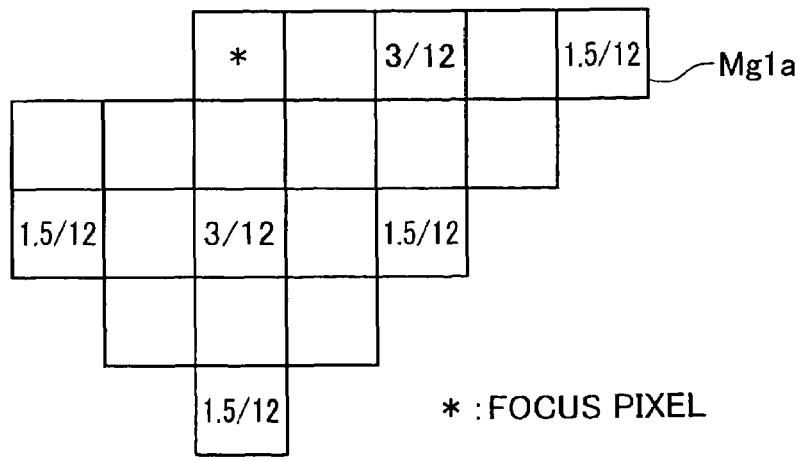
* : FOCUS PIXEL

HIGH-IMAGE-QUALITY HALFTONE PROCESS

BACKGROUND OF THE INVENTION

1. Field of the Invention

This invention relates to technology for printing an image by forming dots on a print medium.

2. Description of the Related Art

As output devices for images created using a computer or images shot using a digital camera or the like, printing devices that print images by forming dots on a print medium are widely used. These printing devices perform gradation expression using a halftone process because there are few dot tone values that can be formed for the input tone values. As one halftone process, an ordered dither method using a dither matrix is widely used. The ordered dither method has a big effect on the image quality according to the dither matrix contents, so for example as disclosed in JP-A-7-177351, JP-A-7-81190, and JP-A-10-329381, an attempt was made to optimize the dither matrix using an analysis method of simulated annealing or genetic algorithm using an evaluation function taking into consideration the human visual sense.

However, with this kind of dither matrix optimization process, ink dots are formed by doing a plurality of scans of a common area on the print medium, and there was no consideration of the degradation of the image quality due to printing of the images in this way. Furthermore, this kind of image quality degradation is not limited to halftone processing using the dither matrix, but also generally occurred with printing using halftone processing with the error diffusion method or other methods.

SUMMARY OF THE INVENTION

The present invention was created to address the problems described above with the prior art, and its purpose is to provide technology for forming ink dots by doing a plurality of scans of the common area on a print medium and for suppressing image quality degradation due to printing of images in this way.

In order to attain the above and the other objects of the present invention, there is provided a printing method of printing on a print medium. The method includes: a dot data generating step of performing a halftone process on image data representing a input tone value of each of pixels constituting an original image, for generating dot data representing a status of dot formation on each of print pixels of a print image to be formed on the print medium; and a print image generating step of forming a dot on each of the print pixels for generating the print image according to the dot data. The print image generating step includes the step of generating the print image by mutually combining dots formed on print pixels belonging to each of a plurality of pixel groups in a common print area. The plurality of pixel groups have a physical difference each other at the dot formation, the dot formation being performed with respect to each of the pixel groups. The halftone process is configured to give specified characteristics to all of dot patterns formed on print pixels belonging to each of the plurality of pixel groups, and to equalize numbers of dots formed on print pixels belonging to each of the plurality of pixel groups, for each of the input tone values. "equalize" has a broad meaning which includes not only "making equal" but also "making close to equal".

With the printing method of the present invention, the focus is on the dot pattern for the dot formation process, and a dither matrix is generated while performing evaluation relating to the dot dispersibility and dot count for each of a plurality of pixel groups formed approximately simultaneously with each main scan, so ink dots are formed by doing a plurality of scans of a common area on a print medium, and by doing this, it is possible to generate a dither matrix configured so as to suppress the degradation of image quality due to image printing.

In specific terms, the dither matrix is generated while performing an evaluation or the dot dispersibility and the dot count for each of the plurality of pixel groups formed approximately simultaneously with each main scan, so there is effective suppression of local dot generation for each input tone value at each pixel group, and it is possible to realize clear print image quality with little unevenness.

The invention of this application can also be applied to the error diffusion method. This is because by "increasing errors diffused to print pixels belonging to a specific pixel group," it is possible to have the constitution such that any of the dot patterns formed on the print pixels belong to each of the plurality of pixel groups has specified characteristics. In specific terms, it is possible to perform processing that diffuses a separate error to each of the plurality of pixel groups in addition to the normal error diffusion, for example, or to increase the weighting of the error diffused to the pixels belonging to the plurality of pixel groups. This is because even when configured in this way, with the original characteristics of the error diffusion method, for each tone value, any of the dot patterns formed on the print pixels belonging to each of the plurality of pixel groups has specified characteristics.

Note that this kind of "error increase" differs from the conventional error diffusion for which the error diffusion volume decreases along with separation from the focus pixel in that a reverse phenomenon occurs by which for the "print pixels belonging to the specific pixel groups," the diffused error becomes larger than the diffusion error to the "print pixels not belonging to the specific pixel groups" closer to the focus pixel, so in contrast to the conventional error diffusion, this causes a clear, objective difference.

Note that the present invention can be realized with various aspects including a printing device, a dither matrix, a dither matrix generating device, a printing device or printing method using a dither matrix, or a printed matter generating method, or can be realized with various aspects such as a computer program for realizing the functions of these methods or devices on a computer, a recording medium on which that computer program is recorded, data signals containing that computer program and embodied within a carrier wave, and the like.

Also, for use of the dither matrix for the printing device, printing method, or printed matter generating method, by comparing the threshold value set in the dither matrix with the image data tone value for each pixel, a decision is made of whether or not dots are formed for each pixel, but, for example, it is also possible to make a decision on whether or not dots are formed by comparing the sum of the threshold value and the tone value with a fixed value. Furthermore, it is also possible to make a decision on whether or not dots are formed according to data generated in advance based on the threshold value and on the tone value without directly using the threshold value. The dither method of the present invention generally is acceptable as long as the judgment of whether or not to form dots is made according to the tone value of each pixel and on the threshold value set in the pixel position corresponding to the dither matrix.

BRIEF DESCRIPTION OF THE DRAWINGS

FIG. 4 is an explanatory drawing showing the dither matrix M for which the grouping process has been performed for the first embodiment of the present invention;

FIG. 5 is an explanatory drawing showing four divided matrixes M0 to M3 for the first embodiment of the present invention;

FIG. 7 is an explanatory drawing showing the status of formation of dots on each of 10 pixels corresponding to the elements in which the threshold value for which the first to tenth dots are formed easily are stored for the dither matrix M;

FIG. 8 is an explanatory drawing showing the dot pattern formed on the printing pixels belonging to each of the plurality of pixel groups;

FIG. 9 is an explanatory drawing showing the dot density matrix DDM for which the dot pattern DPM for which dots were formed on each of the ten pixels at the dither matrix M was numerically converted as the dot density;

FIG. 10 is an explanatory drawing showing the dot density matrixes DD0, DD1, and DD3 for which the dot patterns DP0, DP1, and DP3 for which dots are formed respectively for the three divided matrixes M0, M1, and M3 are numerically converted as the dot density;

FIG. 11 is an explanatory drawing showing the low pass filter for the first embodiment of the present invention;

FIG. 12 is an explanatory drawing showing the status of the same dot density matrix being arranged at the periphery to perform calculation of the peripheral part of the dot density matrix;

FIG. 13 is an explanatory drawing showing the overall evaluation value matrix DFM generated by performing the low pass filter process on the dot density matrix DDM;

FIG. 14 is an explanatory drawing showing the group evaluation value matrixes DF0, DF1, and DF3 generated by performing the low pass filter process on all the dot density matrixes DD0, DD1, and DD3;

FIG. 15 is an explanatory drawing showing the matrixes E0, E1, E2, and E3 for storing the comprehensive evaluation values set for each of the divided matrixes M0, M1, M2, and M3;

FIG. 16 is an explanatory drawing showing the comprehensive evaluation value matrix EM generated by synthesizing the matrixes E0, E1, E2, and E3;

FIG. 18 is an explanatory drawing showing the calculation formula used for the RMS granularity calculation process;

FIG. 19 is an explanatory drawing showing the status of the same dot density matrix being placed in the periphery to perform calculation of the periphery part of the dot density matrix for the variation example;

FIG. 22 is an explanatory drawing showing the error diffusion same main scan group matrix for performing additional error diffusion on a specific pixel group;

FIG. 26 is an explanatory drawing showing the error diffusion synthetic matrix Mg3 used with the third application example.

DESCRIPTION OF THE PREFERRED EMBODIMENT

The present invention is explained in the following sequence based on embodiments.

Figure 1:
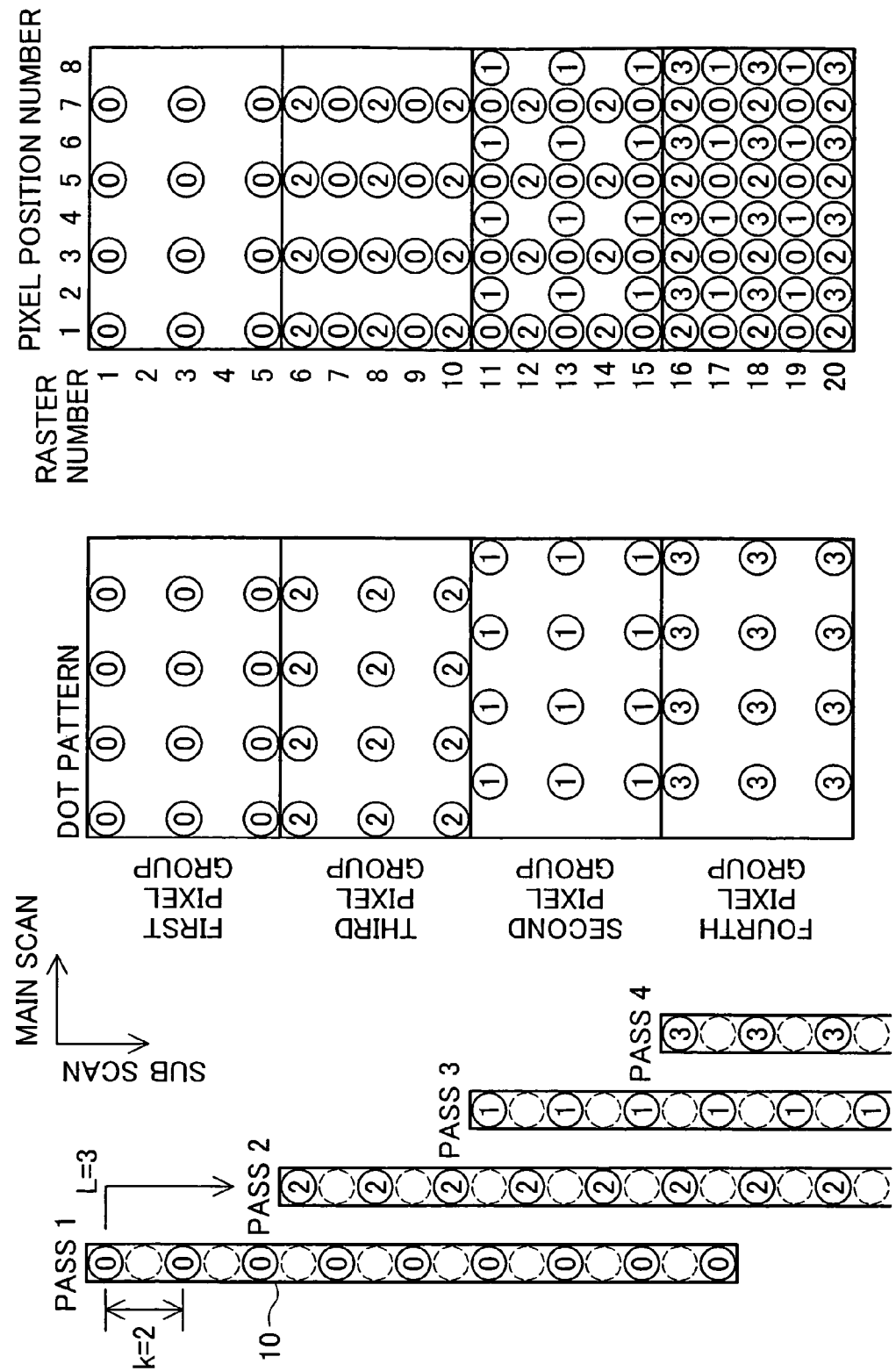
FIG. 1 is an explanatory drawing showing the status of the generation of printing images on the print medium by forming ink dots while performing main scans and sub scans with the first embodiment of the present invention.

A. Generation of Print images Executed While Performing Main Scanning and Sub Scanning:

B. Dither Matrix Generating Method for the First Embodiment:

C. Dither Matrix Generating Method for the Second Embodiment:

D. Variation Example:

A. Generation of Print images Executed While Performing Main Scanning and Sub Scanning FIG. 1 is an explanatory drawing showing the state of the print image being generated on the print medium by forming ink dots while performing main scanning and sub scanning for the first embodiment of the present invention. The main scan means the operation of moving the printing head 10 relatively in the main scan direction in relation to the print medium. The sub scan means the operation of moving the printing head 10 relatively in the sub scan direction in relation to the print medium. The printing head 10 is configured so as to form ink dots by spraying ink drops on the print medium. The printing head 10 is equipped with ten nozzles that are not illustrated at intervals of 2 times the pixel pitch k.

Generation of the print image is performed as follows while performing main scanning and sub scanning. Among the ten main scan lines of raster numbers 1, 3, 5, 7, 9, 11, 13, 15, 17, and 19, ink dots are formed at the pixels of the pixel position numbers 1, 3, 5, and 7. The main scan line means the line formed by the continuous pixels in the main scan direction. Each circle indicates the dot forming position. The number inside each circle indicates the pixel groups configured from the plurality of pixels for which ink dots are formed simultaneously. With pass 1, dots are formed on the print pixels belong to the first pixel group.

When the pass 1 main scan is completed, the sub scan sending is performed at a movement volume L of 3 times the pixel pitch in the sub scan direction. Typically, the sub scan sending is performed by moving the print medium, but with this embodiment, the printing head 10 is moved in the sub scan direction to make the description easy to understand. When the sub scan sending is completed, the pass 2 main scan is performed.

With the pass 2 main scan, among the ten main scan lines for which the raster numbers are 6, 8, 10, 12, 14, 16, 18, 20, 22, and 24, ink dots are formed at the pixels for which the pixel position number is 1, 3, 5, and 7. Working in this way, with pass 2, dots are formed on the print pixels belonging to the third pixel group. Note that the two main scan lines for which the raster numbers are 22 and 24 are omitted in the drawing. When the pass 2 main scan is completed, after the sub scan sending is performed in the same way as described previously, the pass 3 main scan is performed.

With the pass 3 main scan, among the ten main scan lines including the main scan lines for which the raster numbers are 11, 13, 15, 17, and 19, ink dots are formed on the pixels for which the pixel position numbers are 2, 4, 6, and 8. With the pass 4 main scan, among the ten main scan lines including the three main scan lines for which the raster numbers are 16, 18, and 20, ink dots are formed on the pixels for which the pixel position numbers are 2, 4, 6, and 8. Working in this way, we can see that it is possible to form ink dots without gaps in the sub scan position from raster number 15 and thereafter. With pass 3 and pass 4, dots are formed on the print pixels belonging respectively to the second and fourth pixel groups.

When monitoring this kind of print image generation focusing on a fixed area, we can see that this is performed as noted below. For example, when the focus area is the area of pixel position numbers 1 to 8 with the raster numbers 15 to 19, we can see that the print image is formed as noted below at the focus area.

With pass 1, at the focus area, we can see that a dot pattern is formed that is the same as the ink dots formed at the pixel positions for which the pixel position numbers are 1 to 8 with the raster numbers 1 to 5. This dot pattern is formed by dots formed at the pixels belonging to the first pixel group. Specifically, with pass 1, for the focus area, dots are formed at pixels belonging to the first pixel group.

With pass 2, at the focus area, dots are formed at the pixels belonging to the third pixel group. With pass 3, at the focus area, dots are formed at the pixels belonging to the second pixel group. With pass 4, at the focus area, dots are formed at the pixels belonging to the fourth pixel group.

In this way, with this embodiment, we can see that the dots formed at the print pixels belonging to each of the plurality of first to fourth pixel groups are formed by mutually combining at the common print area.

Figure 2:
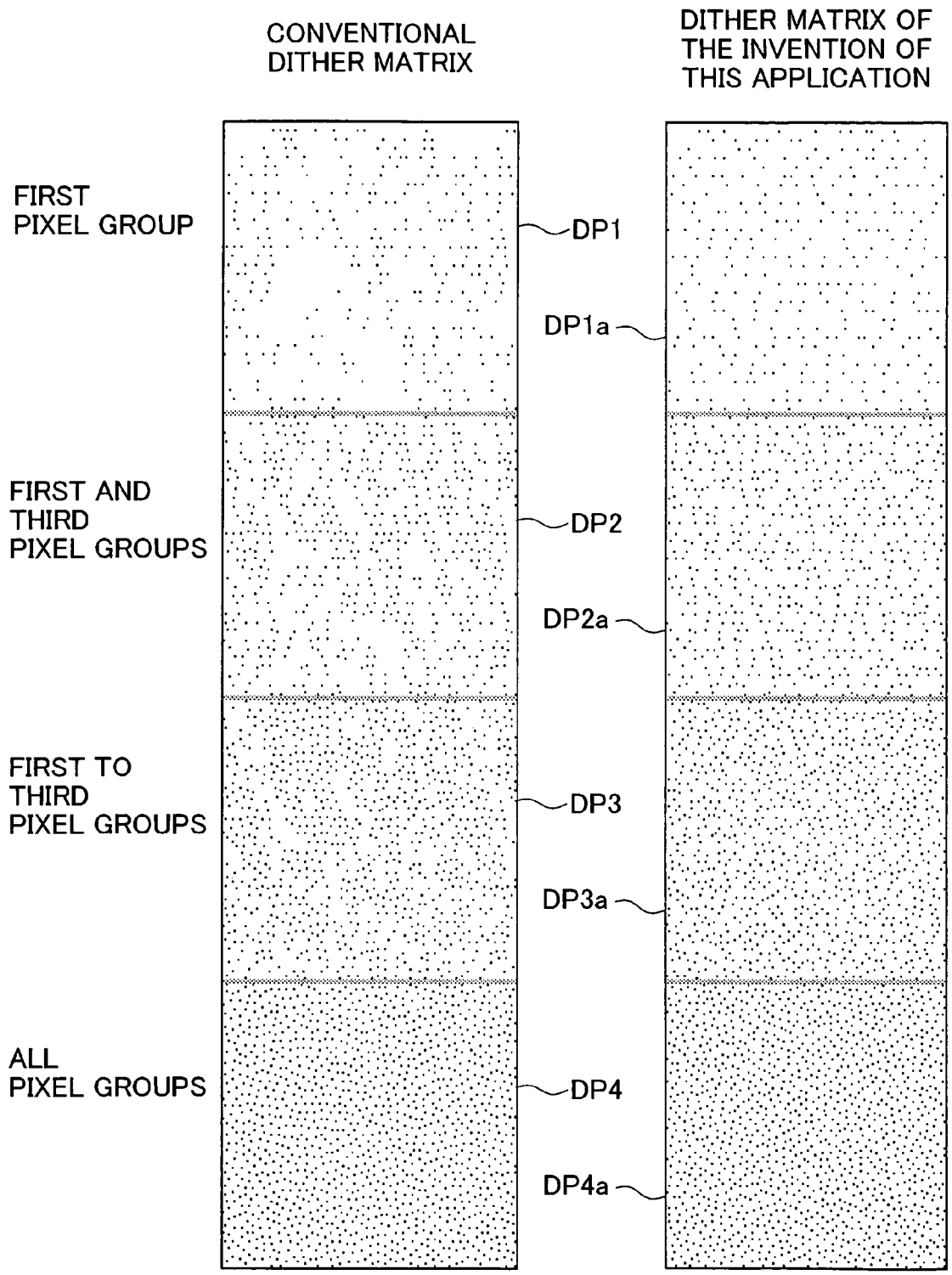
FIG. 2 is an explanatory drawing showing the status of the generation of printing images on the print medium by mutually combining in a common printing area the dots formed on printing pixels belonging to each of the plurality of pixel groups for the first embodiment of the present invention.

FIG. 2 is an explanatory drawing showing the state of generating a print image on a print medium by mutually combining on a common print area the dots formed on the print pixels belonging to each of the plurality of pixel groups for the first embodiment of the present invention. With the example of FIG. 2, the print image is the print image of a specified medium gradation (single color). The dot patterns DP1 and DP1a indicate dot patterns formed at a plurality of pixels belonging to the first image group. The dot patterns DP2 and DP2a indicate dot patterns formed on the plurality of pixels belonging to the first and third pixel groups. The dot patterns DP3 and DP3a indicate dot patterns formed on the plurality of pixels belonging to the first to third pixel groups. The dot patterns DP4 and DP4a indicate dot patterns formed on the plurality of pixels belonging to all the pixel groups.

The dot patterns DP1, DP2, DP3, and DP4 are dot patterns when using the dither matrix of the prior art. The dot patterns DP1a, DP2a, DP3a, and DP4a are dot patterns when using the dither matrix of the invention of this application. As can be understood from FIG. 2, when using the dither matrix of the invention of this application, especially with the dot patterns DP1a and DP2a for which there is little dot pattern overlap, the dot dispersibility is more uniform than when using the dither matrix of the prior art.

With the dither matrix of the prior art, optimization is performed focusing only on the dot dispersibility for the finally formed print image (with the example in FIG. 2, dot pattern DP4) because there is no concept of a pixel group. To say this another way, because the dispersibility of dots formed on the pixels belonging to each pixel group is not considered, the dispersibility of dots formed on the pixels belonging to each pixel group is poor, and dot density sparseness occurs.

The dither matrix of the invention of this application, in addition to the dispersibility of the dots for the print image, also considers up to the dispersibility of the dots formed on the pixels belonging to each pixel group, so the dispersibility of the dots formed on the pixels belonging to each pixel group and the dispersibility of dots for the print image are both improved.

The dither matrix of the invention of this application attempts to optimize not only the finally formed dot patterns, but also focuses on dot patterns with the dot forming process. This kind of focus point did not exist in the past. This is because in the past, the technical basic assumption was that even if the dot pattern dispersion was poor with the dot forming process, the image quality was good if the dispersibility of the dot patterns formed at the end were good.

However, the inventors of this application went ahead and performed an analysis of the image quality of print images focusing on the dot patterns with the dot forming process. As a result of this analysis, it was found that image unevenness occurs due to dot pattern sparseness with the dot forming process. This image unevenness was ascertained by the inventors of this application to be strongly perceived by the human eye as ink physical phenomena such as ink agglomeration unevenness, glossiness, or the bronzing phenomenon. Note that the bronzing phenomenon is a phenomenon by which the status of the light reflected by the printing paper surface is changed, such as the printing surface exhibiting a color of a bronze color or the like due to ink drop pigment agglomeration or the like.

For example, the ink agglomeration or bronzing phenomenon can occur even in cases when a print image is formed with one pass. However, even when ink agglomeration or the like occurs uniformly on the entire surface of the print image, it is difficult to be seen by the human eye. This is because since it occurs uniformly, ink agglomeration or the like does not occur as non-uniform "unevenness" including low frequency components.

However, when unevenness occurs with low frequency areas which are easily recognized by the human eye with ink agglomeration or the like for dot patterns formed in pixel groups for which ink dots are formed almost simultaneously with the same main scan, this is manifested as a strong image quality degradation. In this way, when forming print images using ink dot formation, it was first found by the inventors that optimization of the dither matrix focusing also on dot patterns formed in pixel groups for which ink dots are formed almost simultaneously is linked to higher image quality.

In addition, with the dither matrix of the prior art, optimization was attempted with the prerequisite that the mutual positional relationship of each pixel group is as presupposed, so optimality is not guaranteed when the mutual positional relationship is skewed, and this was a cause of marked degradation of the image quality. However, dot dispersibility is ensured even with dot patterns for each pixel group for which mutual positional relationship skew is assumed, so it was first confirmed by experiments of the inventors of the invention of this application that it is possible to also ensure a high robustness level in relation to mutual positional relationship skew.

Furthermore, for the technical concept of the invention of this application, it was also ascertained by the inventors that the importance increases as the printing speed accelerates. This is because acceleration of the printing speed is connected to the formation of dots in the next pixel group during the time that sufficient time has not been taken for ink absorption. The invention of this application is configured as follows based on these kinds of totally novel findings.

B. Dither Matrix Generating Method for the First Embodiment

Figure 3:
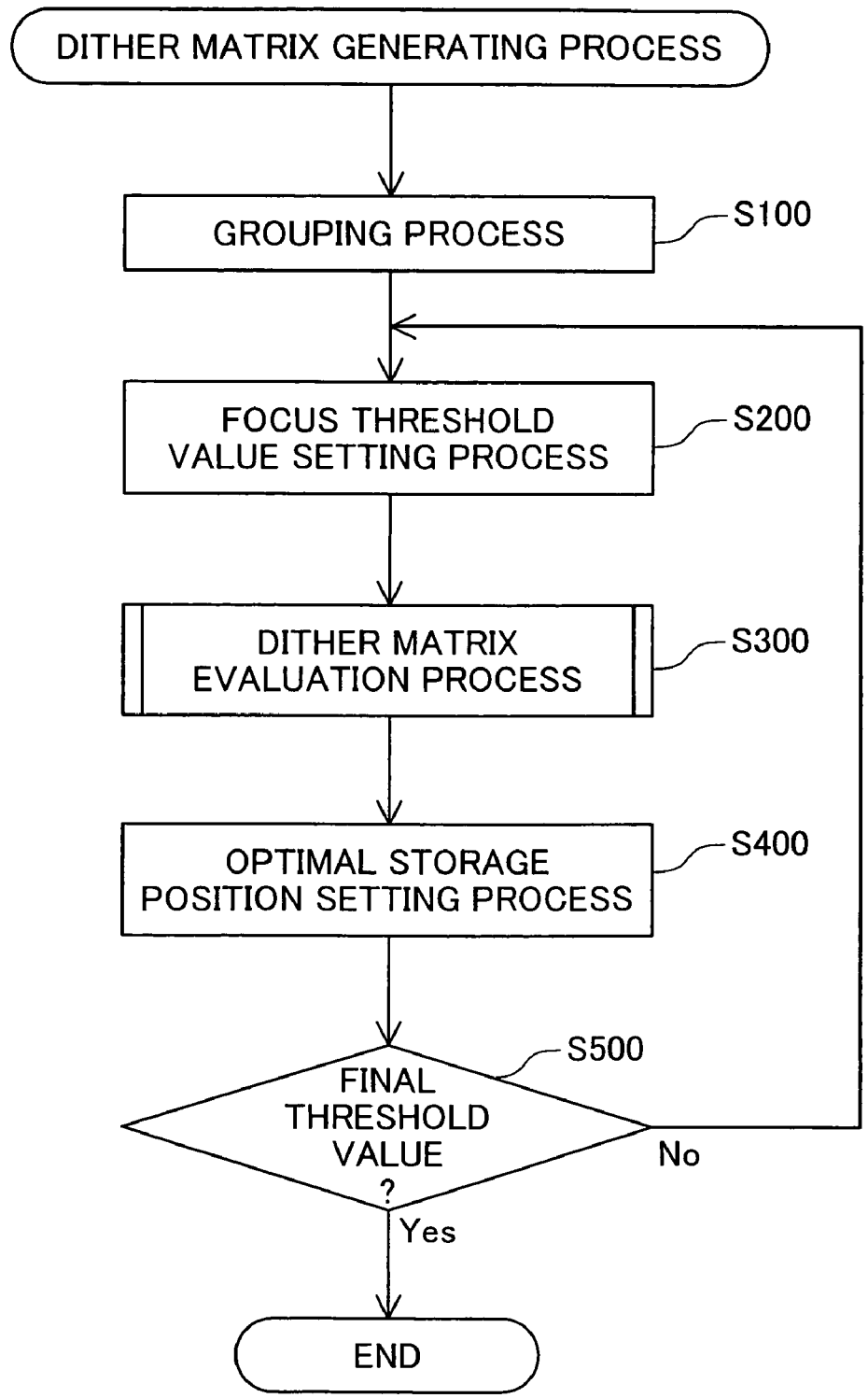
FIG. 3 is a flow chart showing the processing routine of the dither matrix generating method for the first embodiment of the present invention.

FIG. 3 is a flow chart showing the processing routine of the dither matrix generating method for the first embodiment of the present invention. This dither matrix generating method is configured to be able to try to optimize considering dispersibility of the dots formed almost simultaneously with the print image formation process. Note that with this example, to make the description easy to understand, a small dither matrix of 8 rows by 8 columns is generated.

At step S100, the grouping process is performed. With this example, the grouping process is the process of dividing the dither matrix into each element corresponding to a plurality of pixel group for which dots are formed almost simultaneously with the print image formation process.

FIG. 4 is an explanatory drawing showing the dither matrix M for which the grouping process has been performed for the first embodiment of the present invention. With this grouping process, there is a division into the four pixel groups in FIG. 1. The number noted on each element of the dither matrix M indicates the pixel group to which each element belongs. For example, the row 1, column 1 element belongs to the first pixel group (FIG. 1), and the row 1, column 2 element belongs to the second pixel group.

FIG. 5 is an explanatory drawing showing four divided matrixes M0 to M3 for the first embodiment of the present invention. The divide matrix M0 is configured by a plurality of elements corresponding to the elements belonging to the first pixel group among the dither matrix M elements, and the blank space elements which are a plurality of elements that are blank spaces. The blank space elements are elements for which dots are never formed regardless of the input tone value. The divided matrixes M1 to M3 are respectively configured from the plurality of elements corresponding to the pixels belonging to the second to fourth pixel groups among the dither matrix M elements and from blank space elements.

By working in this way, when the grouping process (FIG. 3) of step S100 is completed, the process proceeds to the focus threshold value setting process (step S200).

At step S200, the focus threshold value setting process is performed. The focus threshold value setting process is the process of setting the threshold value that will be subject to stored element setting. With this embodiment, the threshold value is set by selecting in sequence from a relatively small value threshold value, specifically, a threshold value of a value for which dots are formed easily.

At step S300, the dither matrix evaluation process is performed. The dither matrix evaluation process is a process of optimally numerically converting the dither matrix based on the evaluation functions set in advance. With this embodiment, the evaluation function has uniform dot recording density. Specifically, the evaluation criterion is whether or not the plurality of dots formed on the pixels corresponding to each element of the matrix are formed evenly for each tone value. However, with this embodiment, rather than considering only the dither matrix M, evaluation is performed by also considering the four divided matrixes M0 to M3.

Figure 6:
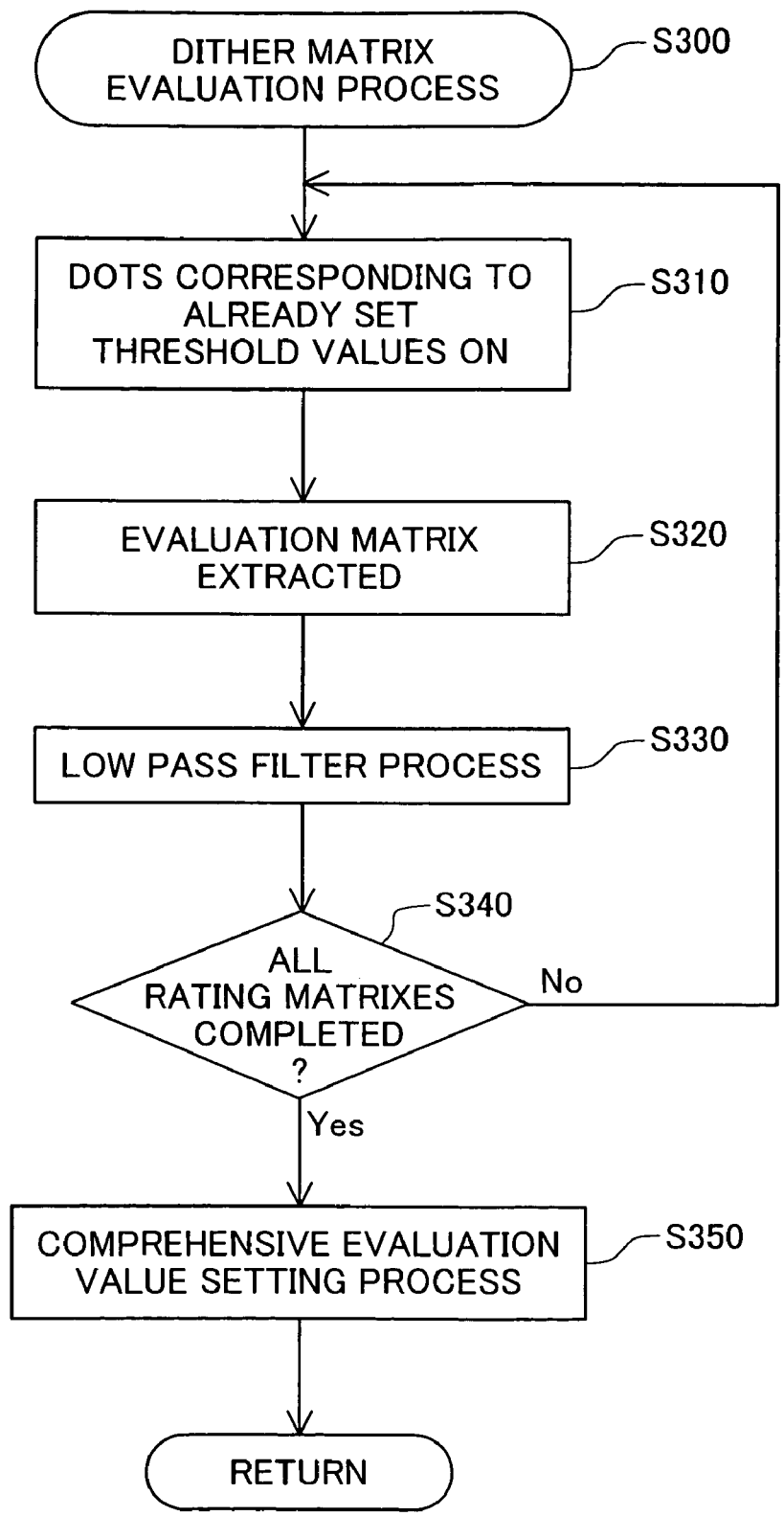
FIG. 6 is a flow chart showing the processing routine of the dither matrix evaluation process.

FIG. 6 is a flow chart showing the processing routine of the dither matrix evaluation process. At step S310, the dots corresponding to the already set threshold value are on. An already set threshold value means a threshold value for which the storage elements are set. With this embodiment, as described previously, threshold values area selected in sequence from values for which dots are formed easily, so when forming dots at the focus threshold value, dots are always formed at pixels corresponding to elements in which the already set threshold value is stored. Conversely, for the smallest input tone values for which dots are formed at the focus threshold value, dots are not formed at pixels corresponding to elements other than the elements in which already set threshold values are stored.

FIG. 7 is an explanatory drawing showing the dot pattern DPM for which dots are formed on each of ten pixels corresponding to the elements in which the threshold value for which the first to tenth dots are formed easily are stored for the dither matrix M. This dot pattern is used to set at which pixel to form the eleventh dot. Specifically, it is used to set the storage element of the focus threshold value for which it is easy to form the eleventh dot. For setting of the storage element, with this embodiment, the storage element is set so that the focus threshold value is stored in the element corresponding to the pixel for which the dot formation is sparse. This is because the evaluation criterion is whether or not there is uniform formation of the plurality of dots formed at pixels corresponding to each element of the matrix for each of the tone values.

FIG. 8 is an explanatory drawing showing the dot pattern formed on the print pixels belonging to each of the plurality of pixel groups. The dot pattern DP0 indicates a dot pattern formed on the print pixels belonging to the first pixel group, and the dot patterns DP1, DP2, and DP3 indicate the dot patterns formed on the print pixels belonging respectively to the second, third, and fourth pixel groups.

At step S320, the rating matrix is extracted. With this embodiment, the rating matrix means, among the four divided matrixes M0 to M3, the three matrixes that are subject to evaluation when setting the focus threshold value storage element or the four matrixes. With this embodiment, evaluation is performed focusing on the rating matrix and the dither matrix M.

The rating matrix is extracted so that from among the four divided matrixes M0 to M3, the number of dots formed on the print pixels belonging to each of the plurality of pixel groups is close to equal or equalized for each of the input tone values. With this embodiment, when there are two or more greater number of divided matrixes for which the number of elements for which the stored threshold value is already set than any of the other divided matrixes, excluding the concerned matrix, three divided matrixes are extracted.

As can be understood from FIG. 8, in the dot pattern DP2, 2 more dots are formed than in any of the other three dot patterns DP0, DP1, and DP3. As a result, with this example, from among the four divided matrixes M0 to M3, except for the divided matrix M2 corresponding to the dot pattern DP2 the three divided matrixes M0, M1, and M3 are extracted as rating matrixes.

FIG. 9 is an explanatory drawing showing the dot density matrix DDM for which the dot pattern DPM for which dots were formed on each of the ten pixels at the dither matrix M was numerically converted as the dot density. FIG. 10 is an explanatory drawing showing the dot density matrixes DD0, DD1, and DD3 for which the dot patterns DP0, DP1, and DP3 for which dots are formed respectively for the three divided matrixes M0, M1, and M3 extracted as the rating matrixes are numerically converted as the dot density.

At step S330, the low pass filter processing is performed. The low pass filter process is the process of extracting the low frequency components for the previously described dot density matrix. Extraction of low frequency components is to optimize the dither matrix considering the visual sensitivity characteristics of humans for which the low frequency area sensitivity is relatively high.

FIG. 11 is an explanatory drawing showing the low pass filter for the first embodiment of the present invention. With this embodiment, the filter processed results are used only for size comparison of the dot density, so normalization of the low pass filter is not performed. For the filter process, as shown in FIG. 12, the same dot density matrix is placed in the periphery and used for calculation of the peripheral part of the dot density matrix.

FIG. 13 is an explanatory drawing showing the overall evaluation value matrix DFM generated by performing the low pass filter process on the dot density matrix DDM. The numbers within each element represent the overall evaluation value. The overall evaluation value means the evaluation value of each element when it is assumed that the eleventh dot is formed for the dither matrix M for which ten threshold value storage elements are set. Large numbers mean the dot density is high, and low numbers mean the dot density is low, specifically, that the dots are sparse.

FIG. 14 is an explanatory drawing showing the group evaluation value matrixes DF0, DF1, and DF3 generated by performing the low pass filter process on all the dot density matrixes DD0, DD1, and DD3 (step S340). The group evaluation value means the evaluation value of each element for each group when it is assumed that the eleventh dot is formed for the three divided matrixes M0, M1, and M3. The overall evaluation value and group evaluation value calculated in this way are used for setting the comprehensive evaluation value. The group evaluation value is calculated only for the elements for which the divided matrixes M0, M1, and M3 store threshold values.

At step S350, the comprehensive evaluation value setting process is performed. The comprehensive evaluation value setting process is set by adding with a specified weighting performed on the overall evaluation value and the group evaluation value. With this embodiment, as an example, "4" and "1" are respectively used for weighting of the overall evaluation value and the group evaluation value.

FIG. 15 is an explanatory drawing showing the matrixes E0, E1, E2, and E3 for storing the comprehensive evaluation values set for each of the divided matrixes M0, M1, M2, and M3. The comprehensive evaluation value is set at "32" for the row 1, column 1 element, for example. This value is set by multiplying "4" which is the weighting value on the value of "8" which is the overall evaluation value stored in the row 1, column 1 element of the matrix for storing the overall evaluation value (FIG. 13), and by adding "0" which is the value of the group evaluation value stored in the row 1, column 1 element of the matrix for storing the group evaluation value (FIG. 14). The matrix E2 shows that all of the elements belonging to the divided matrix M2 are not subject to the storage elements of the focus threshold value.

FIG. 16 is an explanatory drawing showing the comprehensive evaluation value matrix EM generated by synthesizing the matrixes E0, E1, E2, and E3. However, the elements corresponding to the elements belonging to the divided matrix M2 are all "Already set" as described previously. Specifically, processing is performed so as not to be selected as the storage element of the focus threshold value. By doing this, it is possible to suppress concentration of dot formation to the elements belonging to the divided matrix M2 for the input tone values corresponding to the focus threshold values.

At step S400 (FIG. 3), the storage element setting process is performed. The storage element setting process is the process of setting the storage elements of the focus threshold (with this example, the threshold value for which it is easy to form the eleventh dot). With this embodiment, the storage element is set from among the elements for which the comprehensive evaluation value is the smallest. With this example, the comprehensive evaluation values of the three elements of row 3, column 7, row 4, column 4, and row 4, column 6 are the smallest, so one of these can be selected and set based on the knowledge of a trained engineer, or can be selected by the method described later.

When this kind of process is performed for all the threshold values from the threshold value for which it is easiest for dots to be formed to the threshold value for which it is most difficult for dots to be formed, the dither matrix generating process is completed (step S500).

In this way, the dither matrix generating method of this embodiment is able to generate an optimized dither matrix so that variation of the number of dots formed in each pixel group for each input tone value is suppressed at the printing device configured so that the dots formed in the print pixels belonging to each of the first to fourth plurality of pixel groups (FIG. 1, FIG. 2) formed almost simultaneously with each main scan are formed by mutually combining in a common printing area.

C. Dither Matrix Generating Method of the Second Embodiment

Figure 17:
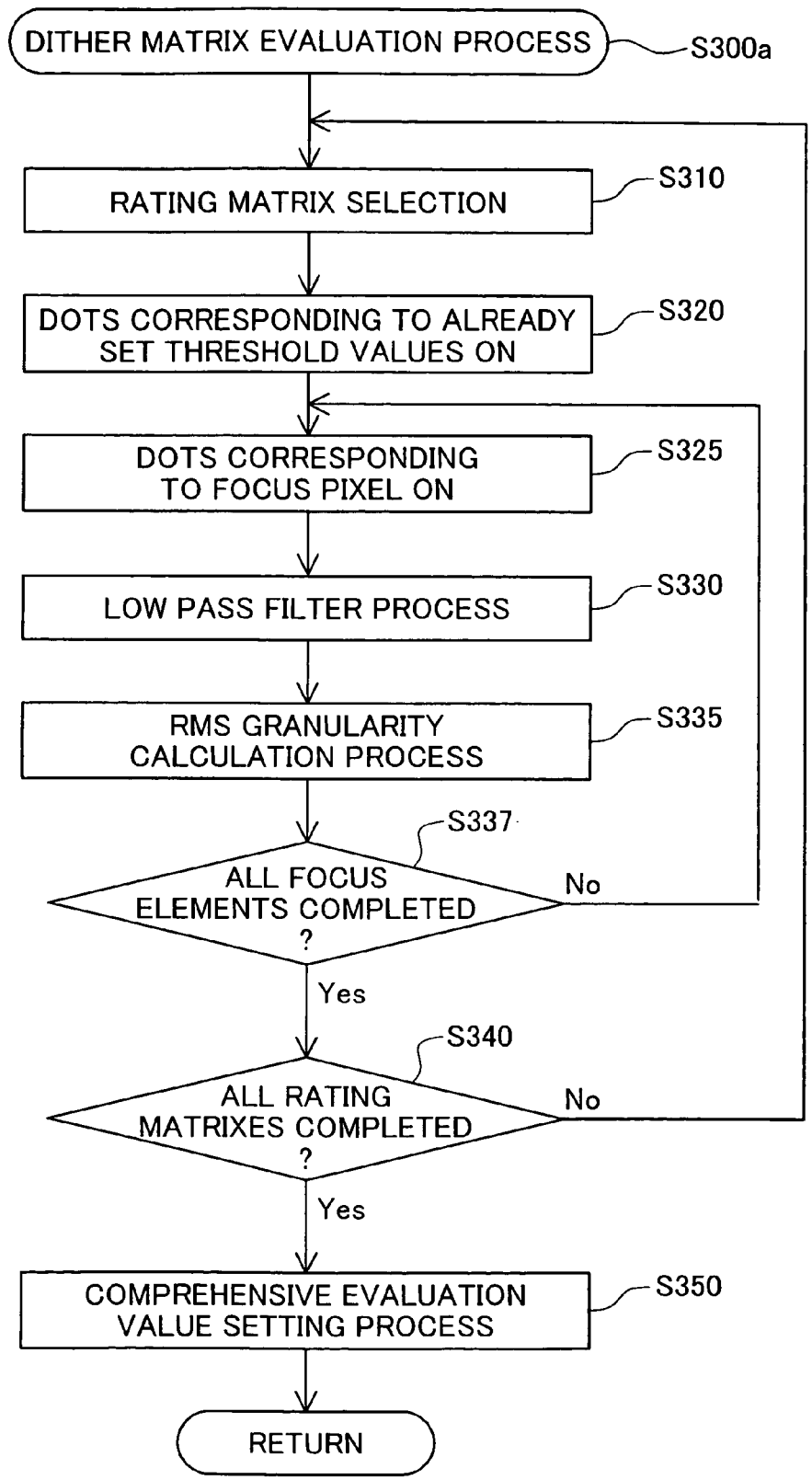
FIG. 17 is a flow chart showing the dither matrix evaluation processing routine for the second embodiment of the present invention.

FIG. 17 is a flow chart showing the dither matrix evaluation processing routine for the second embodiment of the present invention. The generating method of the second embodiment has a different dither matrix evaluation method from the generating method of the first embodiment. Specifically, the generating method of the second embodiment is assumed to be an item for which dots are formed on any of the plurality of pixels corresponding to the plurality of candidate elements not already set as the threshold value storage element, in other words, the unset elements, and the difference from the generating method of the first embodiment is the point that the storage elements are set based on the RMS granularity of the dot pattern formed based on this assumption.

The generating method of the second embodiment can be realized by adding the process of step S325, the process of step S335, and process of step S337 to the generating method of the second embodiment.

At step S325, the dots of pixels corresponding to the focus element are on. The focus element is one element selected from among the plurality of candidate elements. At step S330, the low pass filter process is performed in the same way as with the first embodiment.

At step S335, the RMS granularity calculation process is performed. The RMS granularity calculation process is the process of calculating the standard deviation after doing the low pass filter process for the dot density matrix. The calculation of the standard deviation can be performed using the calculation formula in FIG. 18. Note that the calculation of the standard deviation does not necessarily have to be performed for the dot patterns corresponding to all the elements of the dither matrix M, but instead to reduce the calculation volume, can be performed using only the dot density of the pixels belonging to a specified window (e.g. a 5×5 partial matrix). This kind of process is performed for all the focus pixels (step S337).

The values calculated using this kind of process correlate to the overall evaluation value and group evaluation value of the first embodiment. The second embodiment is able to generate the optimal dither matrix by performing evaluation based on the RMS granularity by handling the calculated overall evaluation values and group evaluation values in the same way as the first embodiment.

Note that the evaluation method of the second embodiment can be combined with the evaluation method of the first embodiment. Specifically, in addition to narrowing down the candidate elements of the second embodiment using the evaluation method of the first embodiment, it is also possible to set the storage elements based on the RMS granularity from the narrowed down candidate elements. For example, with the example shown with the first embodiment, the two element evaluation values are the same, but it is possible to have these two elements be the candidate elements of the second embodiment. Furthermore, it is also possible to constitute this so that elements within a specified value range (e.g. a difference in evaluation values of 5 or less) be candidate elements.

D. Variation Examples

Above, several aspects of the present invention were described, but the present invention is in no way limited to these kinds of aspects, and it can be implemented with various aspects within a scope that does not stray from its key points. For example, optimization of a dither matrix is possible for the following kinds of variation examples.

D-1. With the embodiments described above, having the print image formed with four main scans was a prerequisite, but, for example, the present invention can be applied to various constitutions such as a constitution of having the print image be formed with two main scans of the outgoing direction and bidirectionally, or a constitution for which a plurality of printing heads are used. Generally, the present invention can be used for printing for which the print image is formed by having the dots formed on the print pixels belonging to each of the plurality of pixel groups assumed to be physically different for dot formation be mutually combined at a common printing area.

D-2. With the embodiments described above, to perform calculation of the peripheral part of the dot density matrix, as shown in FIG. 12, the same dot density matrix is placed so as not to be displaced to the periphery, but for example as shown in FIG. 19, it is also possible to displace the matrix for placement.

However, the matrix displacement volume is preferably made so that the group positional relationship does not skew between adjacent dot density matrixes as shown in FIG. 19, for example. This is because by doing this, it is possible to use the same process as the process within a single dot density matrix even with filter processing of a dot density matrix peripheral area that extends across a plurality of dot density matrixes.

D-3. With the embodiments described above, the evaluation criterion is whether or not the plurality of dots formed on pixels corresponding to each element of the matrix overall are formed uniformly for each tone value, but, for example, it is also possible to constitute so that the evaluation is done based not on the matrix overall, but only on the plurality of dots formed on the pixels corresponding to each element of part of the matrix.

D-4. With the embodiments described above, together with performing the low pass filter process, the optimality of the dither matrix is evaluated based on the dot density uniformity or RMS granularity level, but, for example, it is also possible to constitute so that together with performing the Fourier transformation on the dot pattern, evaluation of the dither matrix is performed using the VTF function. In specific terms, it is possible to constitute this so that the evaluation scale (Grainess [sic] scale: GS value) used by Dooley et al of Xerox is applied to the dot pattern, and the dither matrix optimality is evaluated using the GS value. Here, the GS value is the granularity evaluation value which can be obtained by performing a specified process including two dimensional Fourier transformation on the dot pattern to do number conversion and by integrating after cascading with the visual spatial frequency characteristic VTF (reference: Fine Imaging and Hard Copies, Corona Co., Society of Photographic Science and Technology of Japan, Imaging Society of Japan, edited by Godo Publishing Committee. p. 534). However, the former has the advantage of complex calculation such as Fourier transformation not being necessary. Note that the GS value is also called the granularity index.

D-5. With the embodiments and variation examples described above, the constitution is such that the matrixes for which the already set elements are two or more greater than any of the other divided matrixes are removed from among the plurality of divided matrixes are removed from being subjects, but, for example, it is also possible to realize this using various methods including (1) correction of the group evaluation value according to the number of already set elements (adding of the evaluation value, for example), (2) correction of weighting of the group evaluation value according to the number of already set elements, or (3) priority selection from the group with fewer already set elements (for example when the number of already set elements is outside a specified width range). With the present invention, it is sufficient to be configured such that the threshold value storage element is set so that the number of dots formed in each printing pixel belonging to each of the plurality of pixel groups is close to equal for each of the input tone values of the input image data.

D-6. With the embodiments and variation examples described above, by comparing the threshold value set for the dither matrix and the threshold value of the image data for each pixel, a judgment is made for the presence or absence of dot formation for each pixel, but, for example, it is also possible to judge the presence or absence of dot formation by comparing the sum of the threshold value and the tone value with a fixed value. Furthermore, it is also possible to judge the presence or absence of dot formation according to the data generated in advance based on the threshold value and the tone value without using the threshold value directly. The dither method of the present invention generally is sufficient if the presence or absence of dot formation is judged according to the threshold value of each pixel and the threshold value set for the pixel position that the dither matrix corresponds to.

D-7. With the embodiments and variation examples described above, disclosed is a halftone process using a dither matrix, but it is not an absolute prerequisite to have a dither matrix, and it is sufficient as long as with the halftone process of the present invention, all of the dot patterns formed at the print pixels belonging to each of the plurality of pixel groups has specified characteristics, and if the number of dots formed for the print pixels belonging to each of the plurality of pixel groups is close to equal.

D-8. With the embodiments described above, the halftone process is performed using a dither matrix, but it is also possible to use the present invention in a case, for example, of performing the halftone process using error diffusion. Use of error diffusion can be realized by performing error diffusion processing for each of the plurality of pixel groups, for example.

In specific terms, it is possible to perform the process of diffusing a separate error also to the plurality of pixel groups in addition to the normal error diffusion, as well as possible to increase the weighting of the error diffused to the pixels belonging to the plurality of pixel groups. This is because even when configured in this way, with the original characteristics of the error diffusion method, for each tone value, all of the dot patterns formed on the print pixels belonging to each of the plurality of pixel groups has specified characteristics.

Figure 20:
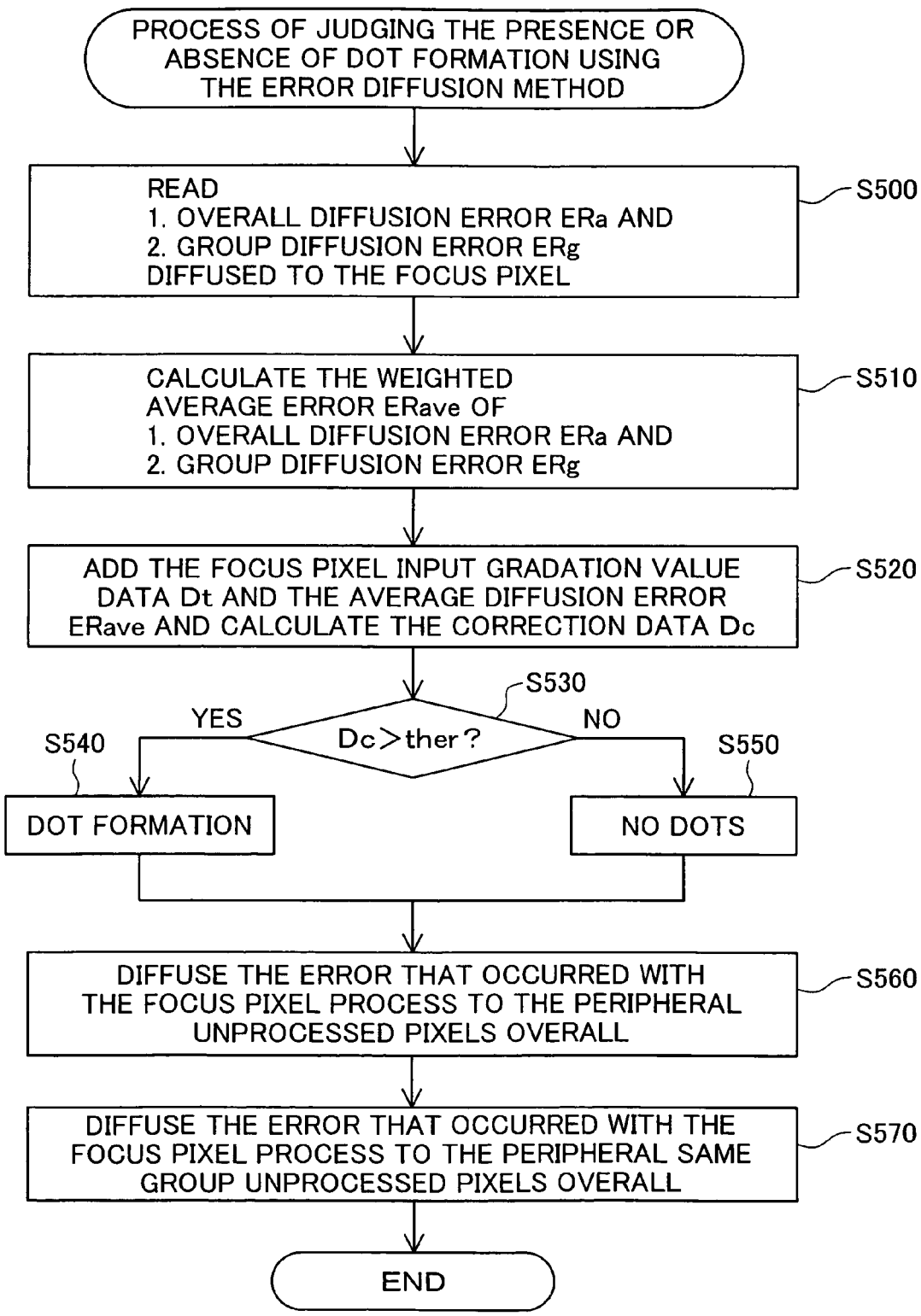
FIG. 20 is an explanatory drawing showing a flow chart of the first application example of the invention of this application for the error diffusion method.

FIG. 20 is an explanatory drawing showing a flow chart of the first application example of the invention of this application for the error diffusion method. The error diffusion method is one type of halftone processing method configured so that the difference between the input tone value and the output tone value is diffused to the peripheral pixels so that the output tone value is close to the input tone value. With the error diffusion method, the focus pixels that are the pixels subject to dot formation judgment are shifted one at a time and the dot formation status of all the print pixels is set. The shift method is typically, for example, a method of shifting the focus pixels one at a time in the main scan direction, and when the processing of all the pixels of this main scan line is completed, shifting the focus pixels to the adjacent unprocessed main scan line.

At step S500, the diffusion error diffused from the other plurality of pixels already processed for the focus pixel is read. With this embodiment, the diffusion error includes the overall diffusion error ERa and the group diffusion error ERg.

Figure 21:
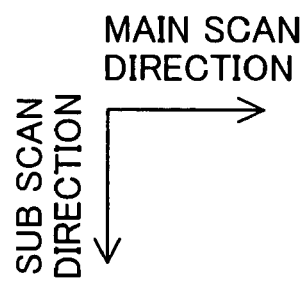
FIG. 21 is an explanatory drawing showing the Jarvis, Judice & Ninke type error diffusion matrix.

The overall diffusion error ERa is the error diffused using the error diffusion overall matrix Ma shown in FIG. 21. With this embodiment, the error is diffused using the error diffusion matrix of the known Jarvis, Judice & Ninke type. This type of error diffusion is performed as typical error diffusion. This type of error diffusion, the same as the prior art error diffusion method, can give specified characteristics to the final dot pattern as the original characteristic of the error diffusion method.

However, with this embodiment, to have specified characteristics in each of the first to fourth plurality of pixel groups (FIG. 1), the point of additionally diffusing the group error diffusion ERg is different from the conventional error diffusion method.

FIG. 22 is an explanatory drawing showing the error diffusion same main scan group matrix Mg1 for performing additional error diffusion to the same pixel group as the focus pixel. The error diffusion same main scan group matrix Mg1 is an error diffusion matrix for additionally diffusing errors to the same pixel group as the focus pixel among the first to fourth plurality of pixel groups. The four divided matrixes M0 to M3 are the same as those shown in FIG. 5, and are shown for representing the positional relationship of the first to fourth plurality of pixel groups.

For example, when the focus pixel belongs to the first pixel group, the error is diffused to the pixel corresponding to the element in which the value "0" is stored with the divided matrix M0. The error diffusion same main scan group matrix Mg1 is configured as the error diffusion matrix in which is stored the coefficient for error diffusion so as to do this kind of diffusion of the error to a pixel. On the other hand, even in the case when the focus pixel belongs to the second to fourth pixel groups formed by the same main scan (pass), the relative positional relationship of the focus pixel and the other pixels is the same, so we can understand that it is possible to use the same error diffusion matrix.

In this way, with this embodiment, specified characteristics are given to the final dot pattern by error diffusion using the error diffusion overall matrix Ma, and also, error is diffused so that specified characteristics are given to the dot patterns of each of the plurality of pixel groups using the error diffusion same main scan group matrix Mg1.

At step S510, the average error ERave which is the weighted average value of the overall diffusion error ERa and the group diffusion error ERg is calculated. With this embodiment, as an example, the weightings of the overall diffusion error ERa and the group diffusion error ERg are respectively 4 and 1. The average error ERave is calculated as the value with the sum of the value of the weighting 4 multiplied on the overall diffusion error ERa and the value of the weighting 2 multiplied on the group diffusion error ERg divided by the weighted total sum of 5.

At step S520, the correction data Dc for which the input tone value Dt and the average error ERave are added is calculated.

At step S530, the calculated correction data Dc is compared with a preset threshold value Thre. When as a result of this comparison, the correction data Dc is larger than the threshold value Thre, it is decided that dots are to be formed (step S540). On the other hand, when the correction data Dc is smaller than the threshold value Thre, it is decided that dots will not be formed (step S550).

At step S560, the gradation error is calculated, and the gradation error is diffused to the unprocessed pixels of the periphery. The gradation error is the difference between the correction data Dc and the actual tone value that occurred by the decision of the presence or absence of dot formation. For example, with the tone value of the correction data Dc as 223, if the tone value that actually occurs with dot formation is 255, the gradation error is $-32$ ($=223-255$). With this step (S560), the error diffusion is performed using the error diffusion overall matrix Ma.

In specific terms, for the pixel adjacent at right of the focus pixel, a value $-224/48$ ($=-32\times 7/48$) for which the coefficient 7/48 corresponding to the right adjacent pixel among the error diffusion overall matrix Ma is multiplied is diffused in relation to the gradation error $-32$ which occurred with the focus pixel. Furthermore, for the two right adjacent pixels of the focus pixel, the value $-160/48$ ($=-32\times 5/48$) for which the coefficient 5/48 corresponding to the two right adjacent pixels among the error diffusion overall matrix Ma is multiplied is diffused in relation to the gradation error $-32$ which occurred with the focus pixel. This kind of error diffusion, the same as with the prior art error diffusion method, gives specified characteristics to the final dot pattern as the original characteristic of the error diffusion method.

At step S570, in contrast to the conventional error diffusion, additional error diffusion is performed using the error diffusion same main scan group matrix Mg1 (FIG. 22). As described previously, this is to give specified characteristics to each of the first to fourth plurality of pixel groups (FIG. 1). This additional error diffusion further also has the action of making the number of dots formed in each of the first to fourth plurality of pixel groups (FIG. 1) close to equal.

The reason for having this kind of action is as described below. This additional error diffusion is closed inside each of the first to fourth plurality of pixel groups, so the error is not diffused to other groups. With this kind of constitution, the sum total of the input tone values and the sum total of the tone values expressed by the dots match with each group, so when the sum total of the input tone values of each group is the same, this is because the dot count is close to equal.

In specific terms, for the right adjacent pixel to the focus pixel, the value 0 (=–32×0) for which the coefficient 0 corresponding to the right adjacent pixel among the error diffusion same main scan group matrix Mg1 is multiplied is diffused in relation to the gradation error –32 that occurred with the focus pixel. Furthermore, the value –64/8 (=–32×2/8) for which the coefficient 2/8 corresponding to the two right adjacent pixels among the error diffusion overall matrix Ma is multiplied is diffused in relation to the gradation error –32 that occurred with the focus pixel.

In this way, with the first application example of the invention of this application to the error diffusion method, it is possible to achieve the goal of the invention of this application by doing additional error diffusion to the same pixel group as the focus pixel.

Figure 23:
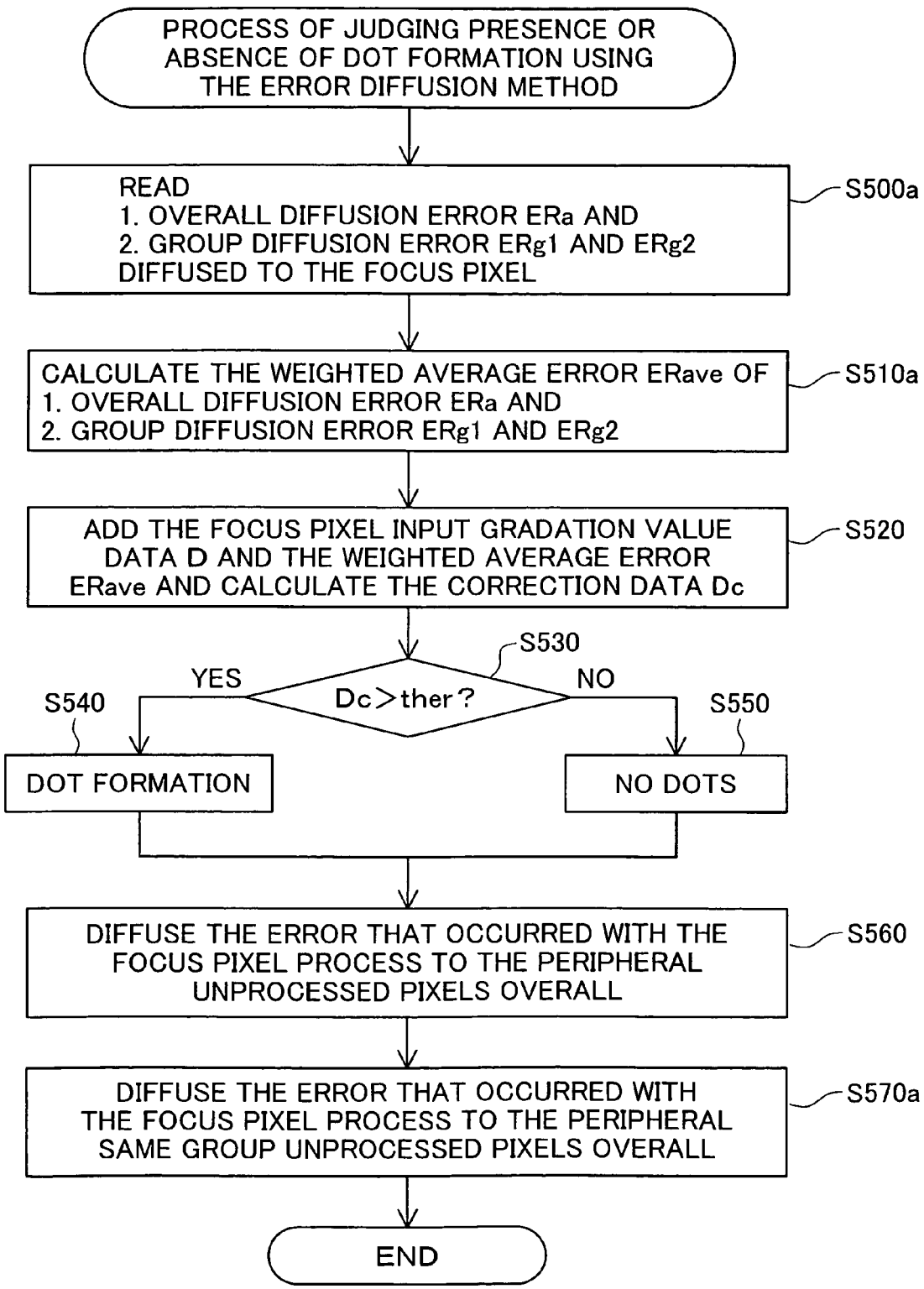
FIG. 23 is an explanatory drawing showing a flow chart of the second application example of the invention of this application on the error diffusion method.

FIG. 23 is an explanatory drawing showing a flow chart of the second application example of the invention of this application on the error diffusion method. The second application example is configured so that the dot dispersibility increases particularly for bidirectional printing. Printing with both directions of the main scan is essential for acceleration of the printing speed, but on the other hand, the pixel position displacement that occurs due to bidirectional printing is a big cause of image quality degradation. In addition, higher precision of the dot forming position for bidirectional printing is a very big cause of more complex devices and higher costs. With the second application example, by improving the dispersibility of the dots of the same pixel group for the main scan direction, the concerned cost complexity and increased costs can be avoided, and it is possible to have both accelerated printing speed and improved image quality.

With the prior art error diffusion method, an attempt to optimize is made with the prerequisite of the mutual positional relationship of each pixel group being presupposed, so the optimal state cannot be maintained when the mutual positional relationship is skewed, and this was a cause of marked degradation of the image quality. However, even with dot patterns for each pixel group for which mutual positional relationship displacement is assumed, the dot dispersibility is ensured, so being able to ensure high robustness in relation to mutual positional relationship displacement was confirmed for the first time by experiment by the inventors of the invention of this application. The second application example is configured based on these kinds of new findings by the inventors for the error diffusion method.

The second application example is configured to replace the three steps S500, S510, and 570 of the first application example with the respective steps S500a, S510a and 570a.

Step S500a differs from the first application example in that the error is diffused in the same way as with the first to fourth pixel groups even for the pixels corresponding to the two groups of element groups M01 and M23 (FIG. 24) for which dots are formed in the same main scan direction. Here, the group of element groups M01 is the group of element groups configured by synthesizing the two element groups M0 and M1 corresponding to the pixels formed by the same main scan direction (e.g. the rightward direction in FIG. 1) with the bidirectional printing. The group of element groups M23 is the group of element groups configured by synthesizing the two element groups M2 and M3 corresponding to the pixels formed by the same main scan direction (e.g. the leftward direction in FIG. 1) for the bidirectional printing. This kind of group synthesizing is performed to make it possible with bidirectional printing to focus on having the dot patterns formed in the same direction as one unit to be easy to shift, and to be able to handle them as one unit even with error diffusion.

At step S510a, the average error ERave which is the weighted average value of the overall diffusion error ERa and the group diffusion error ERg1 and ERg2 is calculated. The group diffusion error ERg1 is the diffusion error correlating to the group diffusion error ERg in the first application example. The group diffusion error ERg2 is the diffusion error diffused for the group of element groups M01 or the group of element groups M23. With this embodiment, as one example, the weightings of the overall diffusion error ERa and the group diffusion error ERg1 and ERg2 are respectively 4, 1, and 2. The average error ERave is calculated as the value for which the sum of the value for which the weighting 4 is multiplied on the overall diffusion error ERa, the value for which the weighting 1 is multiplied on the group diffusion error ERg1, and the value for which the weighting 2 is multiplied on the group diffusion error ERg2 is divided by the weighting sum total 7.

Figure 24:
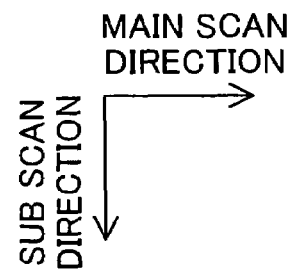
FIG. 24 is an explanatory drawing showing the error diffusion same main scan direction group matrix for performing additional error diffusion on a specific pixel group.

At step S570a, in addition to the error diffusion for the error diffusion of the first application example, further performed is additional error diffusion using the error diffusion same main scan direction group matrix Mg2 (FIG. 24). As described previously, this is to give specified characteristics also for each of the groups of pixel groups corresponding to the groups of element groups M01 and M23.

In specific terms, for the right adjacent pixel of the focus pixel, for example, diffused are the value –224/48 (–32×7/48) for which the coefficient 7/48 corresponding to the right adjacent pixel among the error diffusion overall matrix Ma (FIG. 21) is multiplied, the value 0 (=–32×0) for which the coefficient 0 corresponding to the right adjacent pixel among the error diffusion same main scan group matrix Mg1 (FIG. 22) is multiplied in relation to the gradation error –32, and the value –256/24 (=–32×8/24) for which the coefficient 8/24 corresponding to the right adjacent pixel among the error diffusion same main scan direction group matrix Mg2 (FIG. 24) is multiplied in relation to the gradation error –32.

In this way, with the second application example of the invention of this application for the error diffusion method, it is possible to increase the image quality of bidirectional printing by doing additional error diffusion to the pixel group family for which dots are formed with formation in the same main scan direction as the focus pixel.

Note that the second application example can be applied not only with bidirectional printing but also in cases for which the plurality of pixel groups includes at least one pixel group having physical commonality. Physical commonality, for example, is commonality of the same printing head when printing using a plurality of printing heads. If the main scan direction or the printing heads are the same, there is the property of having the dot formation position mutual relationship be very accurate more than when the main scan direction or printing heads are different, so in addition to having this plurality of pixel groups as one unit and handling them as a pixel group family, if the dot pattern dispersibility is made better, it is also possible to clearly suppress image quality degradation due to dot formation position displacement.

Here, "all have specified characteristics" means that when for example the specified characteristic is the evaluation criterion of the granularity index, as with the prior art, rather than optimizing so that only the granularity index of the print image dot pattern is low, optimization is done so that the pixel group and the pixel group family dot pattern granularity index is low. Specifically, the print image dot pattern granularity index is allowed to be slightly high, and optimization is done so that the pixel group and the pixel group family dot pattern granularity index is low. To say this another way, this means that the constitution is such that each of the granularity indices are mutually close.

In this way, the halftone processing method of the present invention can be objectively distinguished from the prior art halftone processing method by observing each dot pattern in terms of the point of markedly increasing the optimality of the dot pattern of the pixel groups and groups of pixel groups by slightly sacrificing the optimality of the print image dot pattern.

Figure 25:
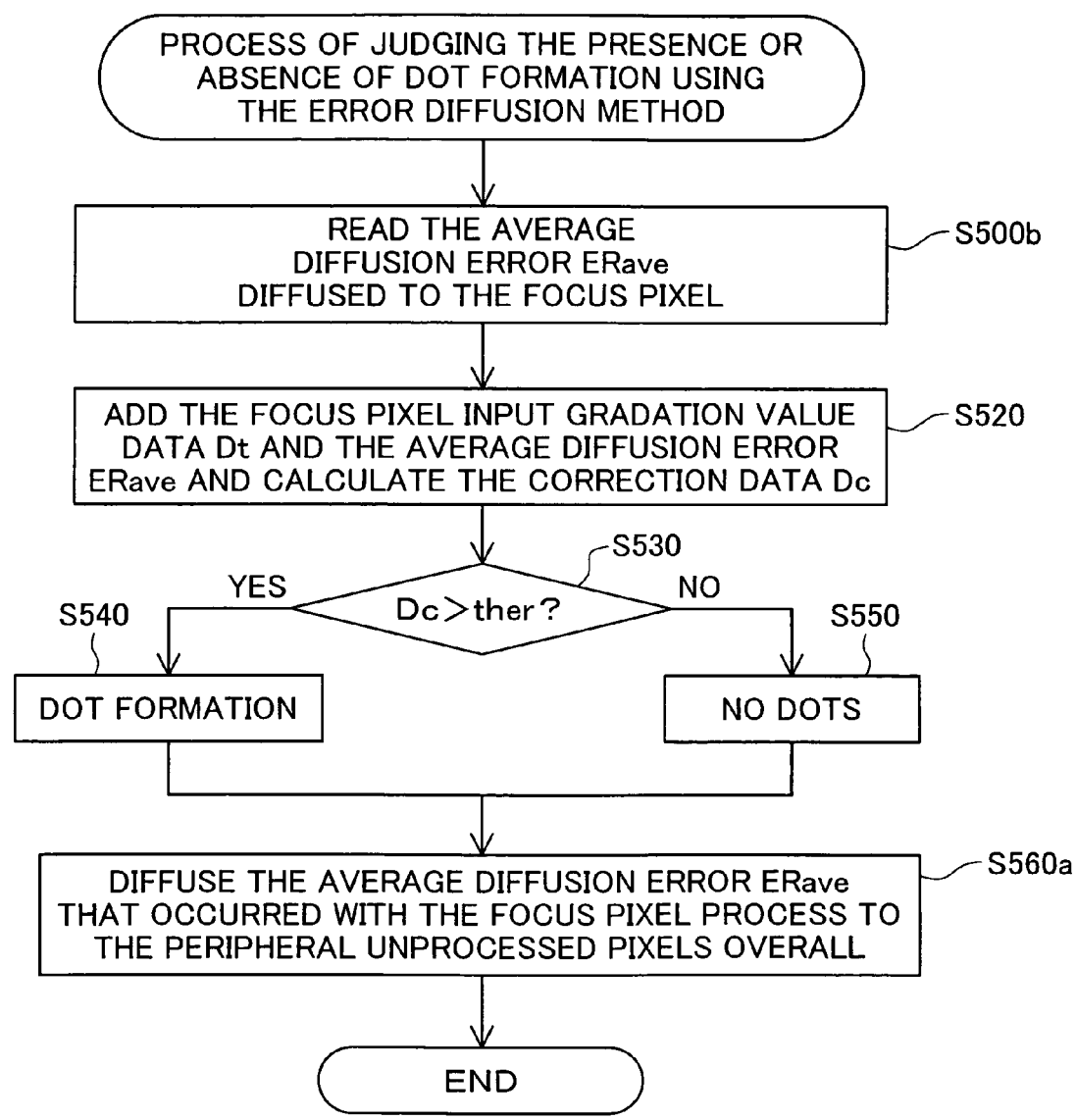
FIG. 25 is an explanatory drawing showing a flow chart of a third application example of the invention of this application for the error diffusion method.

FIG. 25 is an explanatory drawing showing a flow chart of a third application example of the invention of this application for the error diffusion method. The third application example differs from the first and second application examples by the fact that it is possible to perform error diffusion at one time to the same pixel groups or the same groups of pixel groups.

The third application example differs from the second application example in terms of the point that the three steps S500 of the first application example are replaced by step S500b, and also that the other two steps S510 and S570 are deleted. On the other hand, when compared with conventional error diffusion, only the error diffusion matrix used for error diffusion is different. The third application example is an expansion of the first application example using the linearity of diffusion error, so the processing contents are mathematically equivalent to the first application example.

At step S500b, the average diffusion error ERave which is diffused using the error diffusion synthetic matrix Mg3 is read. The average diffusion error ERave is the same as the value calculated at step S510a of the second application example. The error diffusion synthetic matrix Mg3 is the error diffusion matrix configured by synthesizing the error diffusion synthetic overall matrix Ma and the error diffusion same main scan group matrix Mg1 using a specified weighting. The specified weightings are 4 and 1 in that order.

The error diffusion synthetic matrix Mg3 (FIG. 27) is the matrix configured by simply adding the denominator and numerator of each coefficient of the error diffusion synthetic overall matrix Ma and the already weighting adjusted error diffusion same main scan group matrix Mg1a. The already weighting adjusted error diffusion same main scan group matrix Mg1a, to make this kind of addition possible, multiplies the denominator and numerator of each coefficient of the error diffusion same main scan group matrix Mg1 by 1.5. By doing this, the sum total of the numerators of the error diffusion synthetic overall matrix Ma is 48, and the sum total of the numerators of the already weighting adjusted error diffusion same main scan group matrix Mg1a is 12, so the numerator sum total ratio is 4 to 1 with the error diffusion synthetic overall matrix Ma and the error diffusion same main scan group matrix Mg1a. On the other hand, by making the denominator of each coefficient 60 (=48+12), it is possible to have the sum total of the coefficients of the diffusion error be 1. Note that with the error diffusion synthetic matrix Mg3, to make the numerator an integer, the denominator is 120.

The third application example has the advantage of the processing burden being small because with the same processing procedure as conventional error diffusion, it is possible to use the invention of this application simply by replacing the error diffusion matrix, and by being able to perform a plurality of diffusion processes at one time.

Note that this kind of error diffusion synthetic matrix can be configured in the same way for the second application example as well. Also, as described previously, the third application example is mathematically equivalent to the first application example, so the point of having the action of making the number of dots formed for each of the plurality of pixel groups close to equal is also the same as with the first embodiment.

Figure 27:
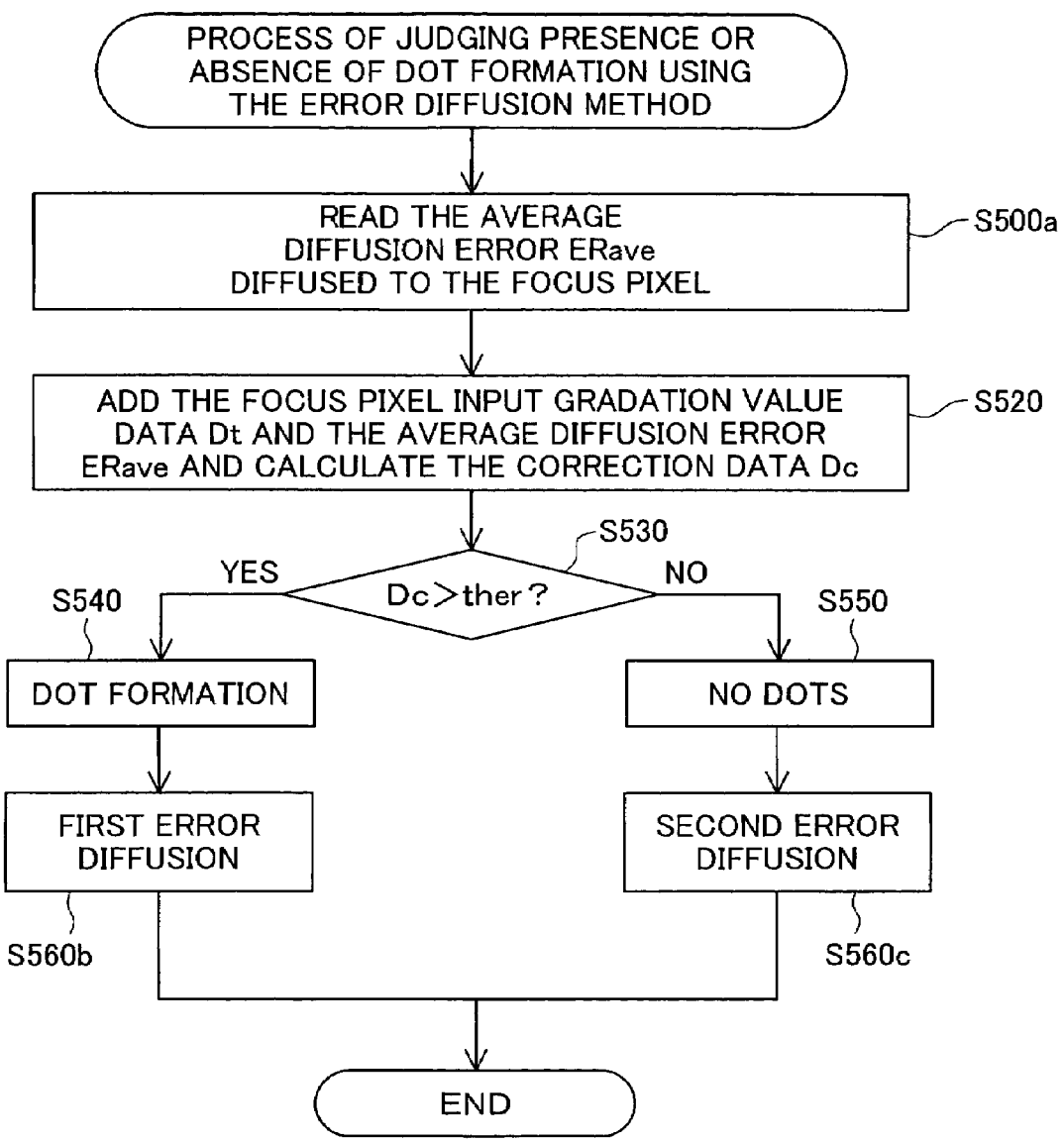
FIG. 27 is an explanatory drawing showing a flow chart of the fourth application example of the invention of this application for the error diffusion method.

FIG. 27 is an explanatory drawing showing a flow chart of the fourth application example of the invention of this application for the error diffusion method. The fourth application example differs from each of the application examples described above in that the error diffusion method is changed according to the dot formation judgment results. The fourth application example is configured by replacing the step S560a of the third application example with the two steps S560b and S560c.

Step S560b is the step that is processed when it is judged that dots are formed. At step S560b, error diffusion is performed using the error diffusion synthetic matrix Mg3 (FIG. 26). Meanwhile, step S560c is the step that is processed when it is judged that dots are not formed. At step S560c, error diffusion is performed using the error diffusion overall matrix Ma (FIG. 21).

In this way, the invention of this application can be configured combined with an error diffusion process such as one that switches the error diffusion process according to the results of the dot formation judgment. Furthermore, for example, it is also possible to have a constitution such as one that uses the error diffusion synthetic matrix Mg3 only for the highlight areas (specified areas with low dot density) according to the input tone value, or to have a constitution to switch to match the breadth of the diffusion error. This has the property of, while being able to realize smooth print images when the diffusion area is wide, having the resolution be low, and the property is known of when the diffusion area is narrow, the resolution is high, but the smoothness decreases.

Note that with each of the error diffusion application examples described above, binarization is performed, but for example it is also possible to apply the invention of this application also to constitutions such as ones for which multi value conversion is performed by comparing with a plurality of threshold values.

D-9. With the embodiments described above, described were cases when the number of print pixels belonging to each of the plurality of pixel groups are equal, but the present invention can also be applied in cases when the number of print pixels belonging to each of the plurality of pixel groups is not equal. For example, this can also be configured so that when the three pixel groups are set to have a printing pixel count ratio of 2:1:1, the dot count has a ratio near 2:1:1. Note that "equalize numbers of dots formed on print pixels belonging to each of the plurality of pixel groups" in the claims has a broad concept that includes this kind of case.

Finally, the present application claims the priority based on Japanese Patent Application No. 2005-268976 filed on Sep. 15 2005, Japanese Patent Application No. 2006-007000 filed on Jan. 16 2006, and U.S. patent application Ser. No. 11/350, 374, which are herein incorporated by reference.

What is claimed is:

1. A printing method of printing on a print medium, comprising:
    a dot data generating step of performing a halftone process on image data representing a input tone value of each of pixels constituting an original image, for generating dot data representing a status of dot formation on each of print pixels of a print image to be formed on the print medium; and a print image generating step of forming a dot on each of the print pixels for generating the print image according to the dot data, wherein the print image generating step includes the step of generating the print image by mutually combining dots formed on print pixels belonging to each of a plurality of pixel groups in a common print area, the plurality of pixel groups having a physical difference each other at the dot formation, the dot formation being performed with respect to each of the pixel groups; and the halftone process is configured to give specified characteristics to all of dot patterns formed on print pixels belonging to each of the plurality of pixel groups, and to equalize numbers of dots formed on print pixels belonging to each of the plurality of pixel groups, for each of the input tone values.

2. The printing method according to claim 1, wherein the specified characteristic is a granularity evaluation value.

3. The printing method according to claim 1, wherein the specified characteristic is either one of blue noise characteristics and green noise characteristics.

4. The printing method according to claim 1, wherein the halftone process determines the state of dot formation using an error diffusion step of diffusing errors to peripheral pixels that are print pixels for which the state of dot formation are undecided, the peripheral pixels being print pixels near the focus pixel which is subject to determination of the state of dot formation, and the error diffusion step is configured to increase errors diffused to print pixels belonging to a specific pixel group which is the pixel group to which the focus pixel belongs among the peripheral pixels, for giving specified characteristics to all of dot patterns formed in print pixels belonging to each of the plurality of pixel groups has.

5. The printing method according to claim 4, wherein the error diffusion step includes:

a first error diffusion step of diffusing a first diffusion error to print pixels of at least part of the peripheral pixels, and a second error diffusion step of diffusing a second diffusion error to print pixels belonging to the specific pixel group among the peripheral pixels.

6. The printing method according to claim 4, wherein the plurality of pixel groups include at least one pixel group family consisting of a plurality of pixel groups having a physical commonality for a dot formation, and the second error diffusion step includes a third error diffusion step of diffusing the second diffusion error to print pixels belonging to the pixel group family to which the focus pixel belongs, among the peripheral pixels.

7. The printing method according to claim 4, wherein the error diffusion step includes a step of diffusing errors to the peripheral pixels based on a specific error diffusion matrix, and the specific error diffusion matrix is configured to increase the error diffused to print pixels belonging to the specific pixel group which is the pixel group to which the focus pixel belongs among the peripheral pixels, for giving specified characteristics to all of dot patterns formed on print pixels belonging to each of the plurality of pixel groups.

8. The printing method according to claim 7, wherein the plurality of pixel groups include at least one pixel group family consisting of a plurality of pixel groups having a physical commonality for a dot formation, and the specific error diffusion matrix is further configured so as to increase the error diffused to the printing pixel belonging to the pixel group family to which the focus pixel belongs among the peripheral pixels, for giving specified characteristics to both dot patterns formed on print pixels belonging to each of the plurality of pixel groups and a dot pattern formed on print pixels belonging to each of the at least one pixel group family.

9. The printing method according to claim 8, wherein the dot data generating step includes a step of preparing a printing head and also generating the print image by forming dots on each of the print pixels according to the dot data with each of the outgoing movement and return movement of the head while performing a main scan of the printing head, and the at least one pixel group family includes a pixel group family for which dots are formed with the outgoing movement of the printing head, and a pixel group family for which dots are formed with the return movement of the printing head.

10. The printing method according to claim 8, wherein the dot data generating step includes a step of preparing a plurality of printing heads and also generating the print image by forming dots on each of the print pixels according to the dot data while performing a main scan of the plurality of printing heads, and the at least one pixel group family includes a plurality of pixel group family in charge of a dot formation by each of the plurality of printing heads.

11. The printing method according to claim 4, wherein the error diffusion step is configured to increase errors diffused to print pixels belonging to a specific pixel group to which the focus pixel belongs among the peripheral pixels only when at least one of the determination of the state of dot formation for the focus pixel and the input tone value matches specified conditions.

12. A dither matrix generating method of generating a dither matrix for determining a status of dot formation on each of print pixels of a print image to be formed on a print medium, by performing a halftone process on input image data, wherein the print image is formed by mutually combining dots formed on print pixels belonging to each of a plurality of pixel groups for which a physical difference is assumed with dot formation using the print image generating step, in a common print area, wherein the dither matrix generating method comprises:

a focus threshold value setting step of setting a specific threshold value as a focus threshold value from among a plurality of threshold values to be stored in each of elements of the dither matrix, the specific threshold value being for which a storage element is not yet set and for which dot formation turns on most easily among the plurality of threshold values;

a matrix evaluation step of setting a comprehensive evaluation value for each assumption that the focus threshold value is stored in each of blank elements that are elements for which stored threshold values are not yet set, wherein dots are regarded as being formed on the pixels corresponding to already set elements that are elements for which the stored threshold values are already set, a storage element setting step of setting the element for storing the focus threshold value according to the comprehensive evaluation value, and a repetition step of repeating each of the steps from the focus threshold value setting step to the storage element setting step, for at least part of the plurality of threshold values, wherein the matrix evaluation step comprises:

an overall evaluation value setting step of setting an overall evaluation value by evaluating the status of dot formation corresponding to all of the groups of the already set elements, a group evaluation value setting step of setting a group evaluation value for each of the element groups by evaluating the status of dot formation corresponding only to elements belonging to a element group corresponding to the pixel group selected from the plurality of pixel groups among the already set elements, and a comprehensive evaluation value setting step of setting the comprehensive evaluation value according to the overall evaluation value and the group evaluation value, wherein the storage element setting step includes an equalization step of equalizing numbers of dots formed on print pixels of each pixel group belonging to each of the plurality of pixel groups, for each input tone value of the input image data.

13. The dither matrix generating method according to claim 12, wherein the equalization step includes the step of adjusting the group evaluation values for the equalization, according to the number of already set elements contained in each of the element groups.

14. The dither matrix generating method according to claim 12, wherein the equalization step includes the step of eliminating a part of the plurality of elements group from being a subject of the focus threshold value storage, according to the number of already set elements included in each of the element groups.

15. The dither matrix generating method according to claim 12, wherein the equalization step includes the step of having a part of the plurality of element groups take priority over other groups of the plurality of element groups for setting a subject of the focus threshold value storage, according to the number of the already set elements included in each of the element groups.

16. The printing method of performing printing on a print medium, comprising:

a dot data generating step of performing a halftone process on image data representing a input tone value of each of pixels constituting an original image, for generating dot data representing a status of dot formation on each of print pixels of a print image to be formed on the print medium; and a print image generating step of forming a dot on each of the print pixels for generating the print image according to the dot data, wherein the print image generating step includes the step of generating the print image by mutually combining dots formed on print pixels belonging to each of a plurality of pixel groups in a common print area, the plurality of pixel groups having a physical difference each other at the dot formation, the dot formation being performed with respect to each of the pixel groups; and the halftone process determines the status of dot formation on each of the print pixels using the dither matrix generated using the dither matrix generating method in claim 12.

17. The printing apparatus for performing printing on a print medium, comprising:

a dot data generator that performs a halftone process on image data representing a input tone value of each of pixels constituting an original image, for generating dot data representing a status of dot formation on each of print pixels of a print image to be formed on the print medium; and a print image generator that forms a dot on each of the print pixels for generating the print image according to the dot data, wherein the print image generator generates the print image by mutually combining dots formed on print pixels belonging to each of a plurality of pixel groups in a common print area, the plurality of pixel groups having a physical difference each other at the dot formation, the dot formation being performed with respect to each of the pixel groups; and the halftone process determines the status of dot formation on each of the print pixels using the dither matrix generated using the dither matrix generating method in claim 12.

18. A printing apparatus for printing on a print medium, comprising:

a dot data generator that performs a halftone process on image data representing a input tone value of each of pixels constituting an original image, for generating dot data representing a status of dot formation on each of print pixels of a print image to be formed on the print medium; and a print image generator that forms a dot on each of the print pixels for generating the print image according to the dot data, wherein the print image generator generates the print image by mutually combining dots formed on print pixels belonging to each of a plurality of pixel groups in a common print area, the plurality of pixel groups having a physical difference each other at the dot formation, the dot formation being performed with respect to each of the pixel groups; and the halftone process is configured to give specified characteristics to all of dot patterns formed on print pixels belonging to each of the plurality of pixel groups, and to equalize numbers of dots formed on print pixels belonging to each of the plurality of pixel groups, for each of the input tone values.

* * * * *